(12) United States Patent
Lin et al.

(10) Patent No.: US 10,350,522 B2
(45) Date of Patent: Jul. 16, 2019

(54) TRUNCATED FILTER CAPSULE

(71) Applicant: Saint-Gobain Performance Plastics Corporation, Solon, OH (US)

(72) Inventors: ZhenWu Lin, Pasadena, CA (US); Hong Shen, Omaha, NE (US)

(73) Assignee: Saint-Gobain Performance Plastics Corporation, Solon, OH (US)

( * ) Notice: Subject to any disclaimer, the term of this patent is extended or adjusted under 35 U.S.C. 154(b) by 132 days.

(21) Appl. No.: 15/291,109

(22) Filed: Oct. 12, 2016

(65) Prior Publication Data
US 2017/0144090 A1 May 25, 2017

Related U.S. Application Data

(60) Provisional application No. 62/249,248, filed on Oct. 31, 2015, provisional application No. 62/266,656, (Continued)

(51) Int. Cl.
*B01D 35/30* (2006.01)
*C02F 1/00* (2006.01)
(Continued)

(52) U.S. Cl.
CPC ............ *B01D 35/30* (2013.01); *B01D 27/08* (2013.01); *B01D 29/0097* (2013.01);
(Continued)

(58) Field of Classification Search
None
See application file for complete search history.

(56) References Cited

U.S. PATENT DOCUMENTS

| 4,944,876 A | 7/1990 | Miller |
| 5,017,286 A * | 5/1991 | Heiligman ........... B01D 35/043 210/266 |

(Continued)

FOREIGN PATENT DOCUMENTS

| DE | 20 2007 000 153 U1 | 4/2007 |
| EP | 0217335 A2 | 4/1987 |
| GB | 2 257 052 A | 1/1993 |

*Primary Examiner* — Benjamin M Kurtz
(74) *Attorney, Agent, or Firm* — Lorusso & Associates

(57) ABSTRACT

Filter capsules for showers and sinks used in surgical settings, clean rooms and other contaminant-sensitive settings having modified outlets for improved splash control. Flat, concave, convex, asymmetric concave and asymmetric convex outlet inserts have pluralities of fluid bores with varying orientations to permit enhanced fluid flow control out of the filter capsules including divergent, convergent and mixed divergent/convergent fluid flows. An inlet with an axis offset at an angle to the longitudinal axis of the filter capsule body permits user control over the fluid flow strike point in a sink or shower stall via rotation of the capsule about the inlet connection point. A recessed outlet improves the prevention of contaminant dispersal by recessing the outlet away from contact points and potential contaminant sources. A filter cartridge top cap includes a downwardly extending extension with a concave bottom end to redirect fluids undesirably entering the filter capsule from the outlet away from the enclosed filter media and out the outlet.

11 Claims, 19 Drawing Sheets

Related U.S. Application Data filed on Dec. 13, 2015, provisional application No. 62/292,273, filed on Feb. 6, 2016.

(51) Int. Cl.
  *B01D 27/08* (2006.01)
  *B01D 29/00* (2006.01)
  *B01D 35/04* (2006.01)

(52) U.S. Cl.
  CPC .............. *C02F 1/003* (2013.01); *B01D 35/04* (2013.01); *C02F 2201/006* (2013.01); *C02F 2303/04* (2013.01); *C02F 2307/06* (2013.01)

(56) References Cited

U.S. PATENT DOCUMENTS

| | | |
|---|---|---|
| 5,128,034 A | 7/1992 | Kool |
| 5,217,802 A | 6/1993 | Scarmoutzos |
| 5,445,735 A | 8/1995 | Kaakinen |
| 5,494,222 A | 2/1996 | Chiu |
| 5,554,414 A | 9/1996 | Moya et al. |
| 5,706,804 A | 1/1998 | Baumann et al. |
| 5,882,515 A | 3/1999 | Lacey et al. |
| 5,981,614 A | 11/1999 | Adiletta |
| 7,000,894 B2 | 2/2006 | Olson et al. |
| 7,032,834 B1 | 4/2006 | Anderson et al. |
| 7,087,173 B2 | 8/2006 | Cote et al. |
| 7,143,898 B1 | 12/2006 | Hoaglin |
| 7,326,334 B2 | 2/2008 | Boyd et al. |
| 7,717,270 B2 | 5/2010 | Boyd et al. |
| 8,961,788 B2 | 2/2015 | Stanley et al. |
| 9,144,366 B2 | 9/2015 | Oner |
| 2001/0037970 A1* | 11/2001 | Farley ............. E03C 1/08 210/435 |
| 2008/0210622 A1 | 9/2008 | Rachel et al. |
| 2010/0096311 A1 | 4/2010 | Wang |

* cited by examiner

RELEVANT ART

RELEVANT ART

RELEVANT ART

RELEVANT ART

RELEVANT ART

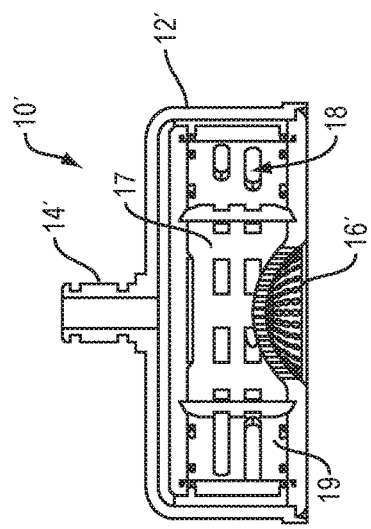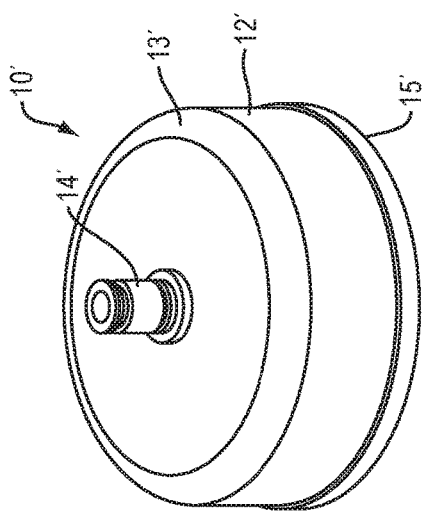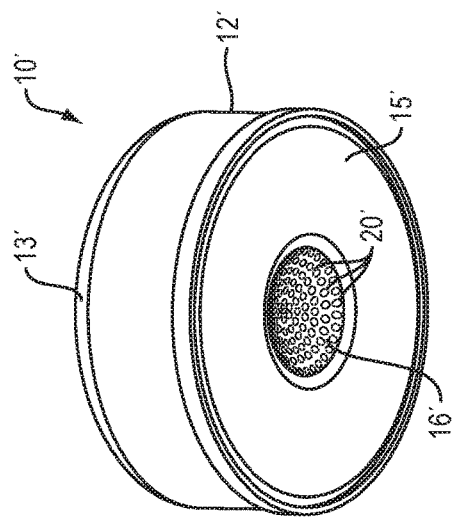
FIG. 16
FIG. 14
FIG. 15
FIG. 12
FIG. 13

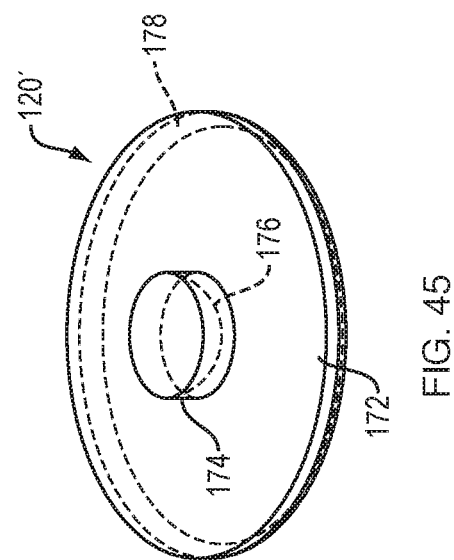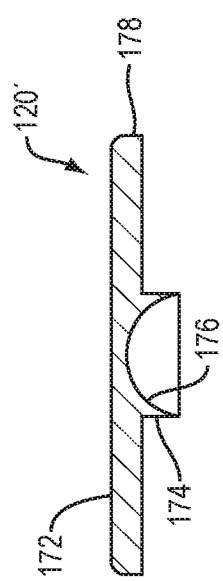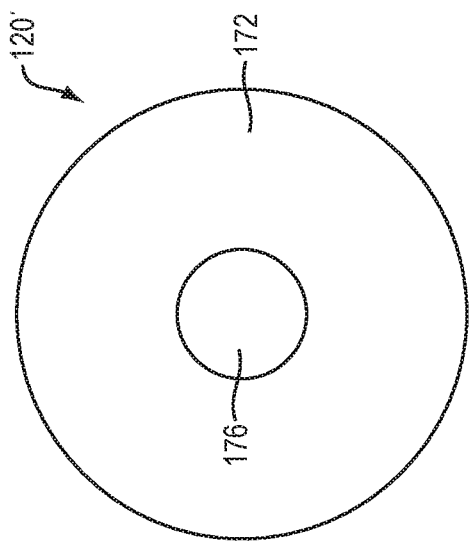

TRUNCATED FILTER CAPSULE

CROSS-REFERENCE TO RELATED APPLICATIONS

This regular utility application claims the benefit of U.S. Provisional Application Ser. No. 62/249,248, filed Oct. 31, 2015, U.S. Provisional Application Ser. No. 62/266,656, filed Dec. 13, 2015, and U.S. Provisional Application Ser. No. 62/292,273, filed Feb. 6, 2016, the contents all of which are incorporated in their entirety herein by reference.

FIELD OF THE DISCLOSURE

The disclosure relates to filter capsule apparatus used to filter fluids emitted by showers and sinks in contaminant sensitive environments. More particularly, the disclosure concerns disposable filter capsules, housings or shells with modified outlets to reduce overall space requirements and to reduce splash patterns so as to prevent the potential spread of contaminants.

BACKGROUND OF THE DISCLOSURE

In surgical suite settings, clean rooms, laboratories and other contaminant sensitive environments, showers and sinks are employed to remove and wash away unwanted, and potentially dangerous, biologic and inorganic materials. To accomplish this, filters may be attached to shower heads and faucets to ensure a clean water supply is used to remove the unwanted materials. These systems often involve gravity fed, or pressurized systems to deliver the water. The water force is used to displace any contaminants from specified surfaces whether from instruments or from body parts. In doing so, however, the pressurized or gravity-fed water flow used to forcefully detach unwanted contaminants leads to splashing that can undesirably transfer the contaminant materials to other surfaces and body parts.

Another problem concerns spatial limitations in shower stalls and sinks. Any filter attachment has to fit within a certain amount of space. Conventional filter capsules, such as those shown generally as 1 in FIGS. 1-4, have a capsule body 2 with an inlet 3 extending from one end and an outlet 4 extending from an opposite end that may or may not include perforations 6. A filter or filter cartridge 5 is secured in the filter capsule as shown in FIG. 2. The length of the body will be determined by the filter requirements. The filter needed to ensure the delivery of clean, sterile water will drive the capsule dimensions. The port dimensions will be driven by the connecting features of faucets and shower heads. These requirements inevitably lead to filter capsule sizes that may push the spatial limitations of the larger fixtures to which they are attached and limit the ability to control splashing both in terms of force and splash patterns.

One example of a relevant art filter capsule modified to alter an outlet port configuration is shown in FIG. 5 and derived from U.K. Patent Application No. GB 2 257 052. The '052 application discloses a water filter assembly for a faucet. A top subassembly is used to secure the filter assembly to a faucet. A replaceable filter cartridge is secured to the top subassembly. Unlike common filter cartridges that include an outlet port that extends outwardly from a body of the filter cartridge, the '052 cartridge has an outlet formed on a bottom end with a convex shaped filter/screen labeled a "flow straightening filter" inserted and secured to the outlet opening. The purpose of the filter/screen is described as being to "prevent the scattering of water." A bottom plate secures the screen to the outlet opening.

Notably, the screen is inset from a bottom end of the filter cartridge so that the walls of the outlet appear to create a cylindrical channel for fluids that migrate past the "filter." The walls of the outlet thus form the final restriction to water flow dispersal. This will diminish the "flow straightening" effect of the convex screen.

Another similar filter capsule construction is shown in FIG. 3 and derived from German Patent Application No. DE 20 2007 000 152 U1 that discloses a filter capsule with an outlet opening formed on a bottom of the capsule covered with a perforated disc secured to the capsule outlet. The overall shape of the disc follows the general round contours of the capsule housing and appears to be designed not to protrude from the housing. The disc appears to be structured to function like a typical aeration faucet insert. The '152 disclosure lacks any significant detail about the perforations other than the evenly spaced pattern of perforations.

Although these relevant art references appear to provide a means to reduce the overall dimensions of a filter capsule, they do not adequately solve the problem of controlling splash patterns to minimize the unwanted spread of contaminants. What is needed and what is disclosed herein are combinations of filter capsules with modified outlet port covers that provide enhanced splash control and overall reduced capsule spatial requirements. These and other objects of the disclosure will become apparent from a reading of the following summary and detailed description of the disclosure as well as a review of the appended drawings.

SUMMARY OF THE DISCLOSURE

In one aspect of the disclosure, a filter capsule assembly, adapted for attachment to a shower head or faucet, includes a filter capsule with an inlet port extending from a top end of the capsule. As used herein, "filter capsule," "filter shell," and "filter housing" are terms used to synonymously describe an element used to secure and enclose a filter formed from any filtering structure or material including filter membrane material and loose media. Filter cartridges, permanent or replaceable, formed with filter discs, membranes (of any configuration included pleated and toroidal) and/or loose filter media may also be secured in the disclosed filter capsules. In place of a conventional projecting outlet, a flat circular disk with a plurality of perforations is secured over an outlet bore to provide a means of egress for filtered fluids as well as a means to control flow and splash patterns.

In another aspect of the disclosure, a filter capsule having an enclosed filter/filter cartridge has an inlet extending from a top end adapted to be secured to a shower arm or faucet. An outlet bore formed on a bottom of the filter capsule is enclosed with a concave insert having a plurality of perforations to permit fluid exit from the capsule. The perimeter of the insert is set to be substantially flush with the bottom of the filter capsule. The concave shape of the outlet insert as well as the shape and organization of the perforations provide enhanced fluid flow control and splash dispersion control.

In a still further aspect of the disclosure, a filter capsule having an enclosed filter/filter cartridge subassembly has an inlet extending from a top end adapted to be secured to a shower arm or faucet. An outlet bore is formed on a bottom of the filter capsule and is enclosed with a modified convex outlet insert. The convex insert has a plurality of perforations to permit fluids to exit the filter capsule in a controlled manner. The perimeter of the convex insert is secured to the bottom of the filter capsule so as to be substantially flush with the bottom. The modified convex insert includes either a raised or inset central section with a series of flow controlling perforations to control fluid flow and reduce overall splash patterns. The modified convex insert may also be formed with an asymmetric convex shape to permit directional control of the flow pattern by rotating the capsule about its inlet attachment point.

In a yet further aspect of the disclosure, a combined filter capsule/filter cartridge has an inlet that extends upwardly from a cap of the filter capsule and has an axis offset from a longitudinal axis of the capsule so as to offset the capsule relative to the inlet connection point. The capsule orientation permits directional control of the fluid path for fluids exiting the capsule/cartridge. Rotation of the capsule about the inlet connection point rotates the fluid about a circular path. Selective rotation of the capsule permits selective control of the portion of the enclosure (sink, shower stall, etc.), upon which the fluid stream is directed. This enables the user to direct the fluid stream to a portion of the enclosure most likely to reduce splash and the potential spread of contaminants agitated and disbursed by the force of the fluid stream.

The capsule body is formed with filter-cartridge-like features projecting radially inwardly from an inner wall of the capsule body. A plurality of columns extend radially inwardly from the inner wall and include at least one filter cartridge supporting ring that supports a filter cartridge subassembly. The columns promote fluids entering the capsule to flow through the enclosed filter media and help to maintain the spatial orientation of the filter media in the capsule. A filter cartridge cap having a cross-sectional dimension smaller than the cross-sectional dimension of the chamber defined by the capsule wall is secured to the columns to further enclose the resident filter media. This creates an annular gap between the capsule top and the cartridge top that directs incoming fluid toward the capsule chamber periphery and into a second set of axial gaps formed between the plurality of columns to permit the passage of incoming fluids down the capsule chamber and radially inwardly into the enclosed filter media.

A recessed outlet insert is secured to a bottom end of the filter capsule body and aligned with the longitudinal axis of the capsule. The recess outlet improves the prevention of tactile contamination of the outlet by positioning the outlet and fluid disbursing apertures or bores away from the bottom surface of the capsule. A filter cartridge subassembly comprising filter media and a cartridge core dimensioned to receive and be superposed about the recessed outlet is secured in the capsule body via attachment to a flange section of the recessed outlet and a bottom surface of the cartridge cap.

In yet another aspect of the disclosure, a filter capsule is formed with an integral capsule body and filter capsule top with an inlet that extends upwardly from the top of the filter capsule. The inlet has an axis offset from a longitudinal axis of the capsule so as to offset the capsule relative to the inlet connection point. The capsule orientation permits directional control of the fluid path for fluids exiting the capsule/cartridge as previously disclosed hereinabove.

A filter cartridge is secured in a filter chamber defined by the capsule. The cartridge is secured in the chamber via direct connection to a recessed outlet insert secured to a bottom of the filter capsule and aligned with the longitudinal axis of the capsule. The recess outlet improves the prevention of tactile contamination of the outlet by positioning the outlet and fluid disbursing apertures or bores away from the surface of the capsule. The filter cartridge has a cross-sectional dimension smaller than the cross-sectional dimension of the filter chamber. This creates an annular gap defined by the outer wall of the filter cartridge and the inner wall of the capsule that provide a fluid path to the enclosed filter media. Openings or through bores in the cartridge frame provide fluid communication between the gap and the filter media. An inner section of the frame defines a filter cartridge core in fluid communication with the recessed outlet. The core is dimensioned to receive and be superposed about the recessed outlet.

A filter cartridge top is secured to a top end of the filter cartridge frame to further secure the enclosed filter media. The cartridge top is formed with a cylindrical cartridge top extension that extends downwardly into the cartridge core and has a concave surface formed on a bottom side of the extension to redirect fluids directed upwardly into the recessed outlet toward a center of the cartridge core and out of the outlet, away from the enclosed filter media.

The recessed outlet may be formed with an optional cylindrical extension that extends below a plane of the outlet bottom surface to further prevent the introduction of contaminants into the filter capsule. This combination of construction features improves the desired unidirectional flow of fluids through the filter capsule. It also minimizes any backflow into the capsule and the potential for contamination of the enclosed filter media caused, for example, by fluid emitted from the capsule hitting a contaminated surface, such as a sink basin or a pair of hands placed under the filter capsule for washing, and rebounding back into the capsule off the surface.

In another aspect of the disclosure, outlet inserts are formed in a variety of configurations including flat to impart different flow pattern characteristics. The overall shapes of the outlet inserts may be flat, hemi-spherical, parabolic, spherically asymmetric, or have curvatures defined by polynomial equations. The perforation patterns and fluid bore orientations may be adjusted to provide flow pattern control by creating converging or diverging flow patterns to ultimately produce reduced splash patterns of the filtered effluent.

In another aspect of the disclosure, the outlet inserts of the filter capsule embodiments disclosed herein may be formed illustratively as integral or modular inserts with surfaces dimensioned and adapted to be secured to corresponding surfaces on the filter capsule via any of a variety of methods including sonic bonding and adhesives. These and other aspects of the disclosure will become apparent from a review of the appended drawings and a reading of the following detailed description of the disclosure.

BRIEF DESCRIPTION OF THE DRAWINGS

FIG. 12 is a side sectional view in elevation of a filter capsule with a concave outlet insert according to another embodiment of the disclosure.

FIG. 13 is a bottom view of the filter capsule shown in FIG. 12.

FIG. 14 is a top side perspective view of the filter capsule shown FIG. 12.

FIG. 15 is a bottom side perspective view of the filter capsule shown in FIG. 12.

FIG. 16 is a side sectional view in elevation of the filter capsule shown in FIG. 12.

FIG. 44 is a side sectional view of a filter cartridge cap with a domed extension according to the embodiment of the disclosure shown in FIG. 40.

FIG. 45 is a top side perspective view in partial phantom of the filter cartridge cap shown in FIG. 44.

FIG. 46 is a bottom view of the filter cartridge cap shown in FIG. 40.

DETAILED DESCRIPTION OF THE DISCLOSURE

Figure 2:
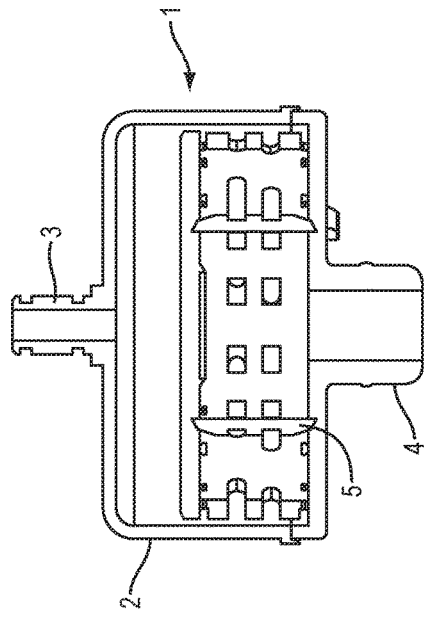
FIG. 2 is a side sectional view of the relevant art filter capsule shown in FIG. 1.
Figure 4:
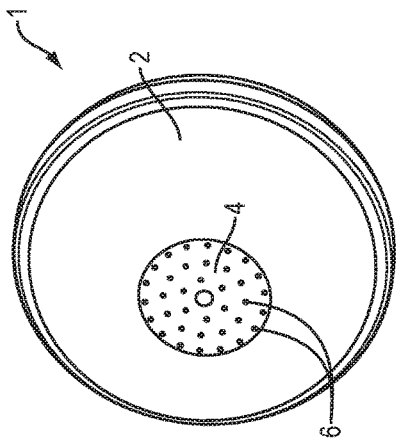
FIG. 4 is a bottom perspective view of the relevant art filter capsule shown in FIG. 3.
Figure 1:
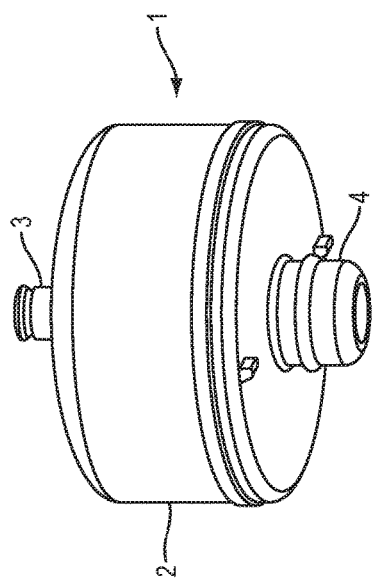
FIG. 1 is a bottom/side perspective view of a relevant art filter capsule.
Figure 3:
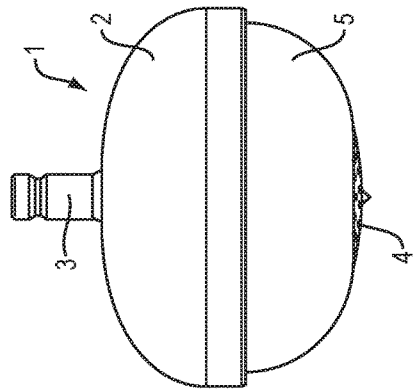
FIG. 3 is a side elevational view of another relevant art filter capsule.
Figure 5:
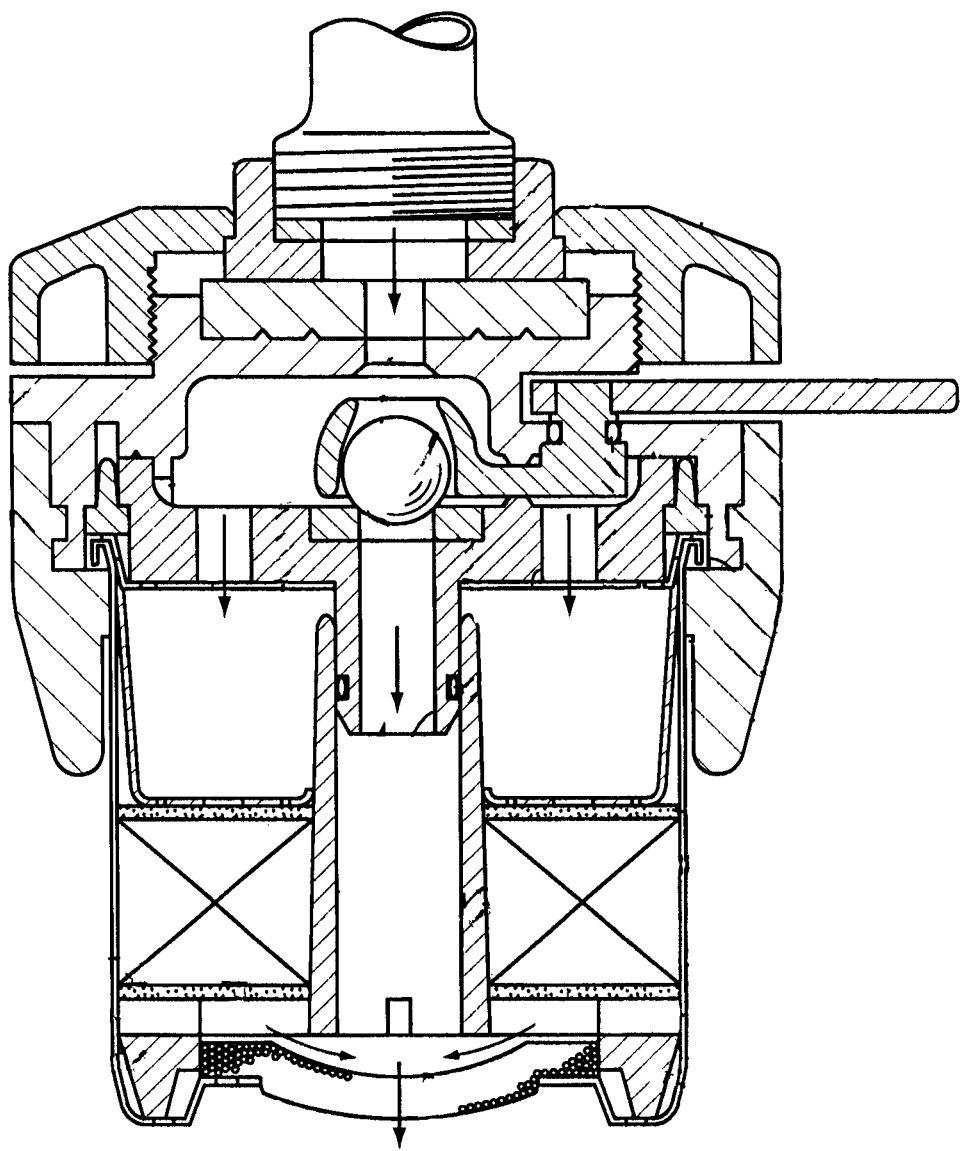
FIG. 5 is a side sectional view in elevation of yet another relevant art filter capsule.
Figure 7:
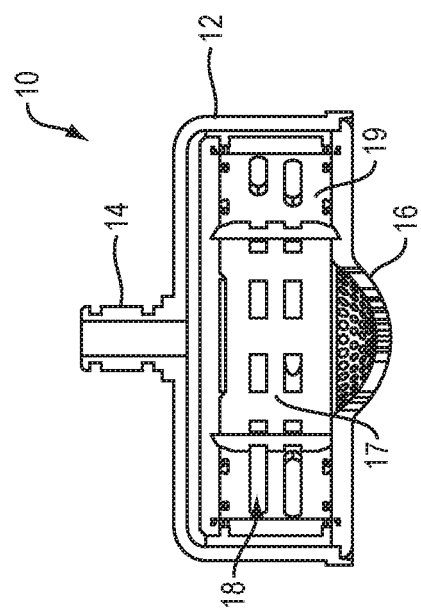
FIG. 7 is a side sectional view in elevation of the filter capsule shown in FIG. 6.
Figure 6:
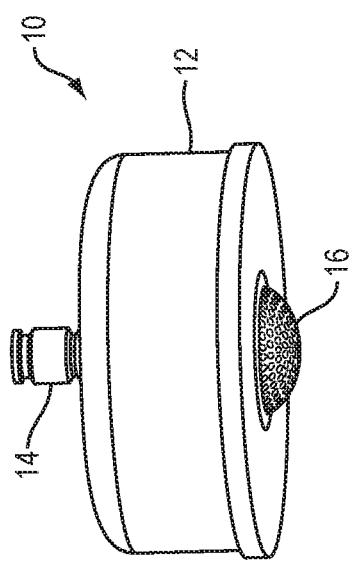
FIG. 6 is a bottom/side perspective view of a filter capsule with a convex outlet insert according to one embodiment of the disclosure.
Figure 10:
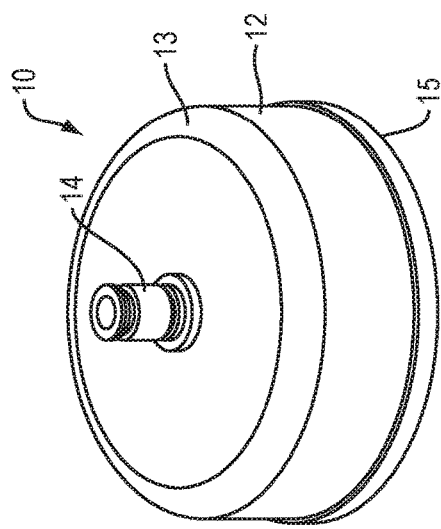
FIG. 10 is a top perspective view of the filter capsule shown in FIG. 6.
Figure 11:
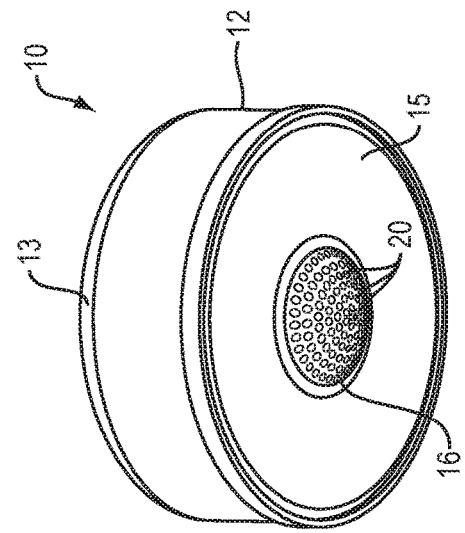
FIG. 11 is a bottom perspective view of the filter capsule shown in FIG. 6.
Figure 8:
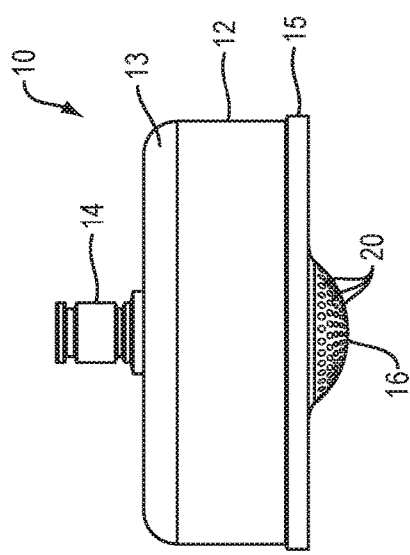
FIG. 8 is a side view in elevation of the filter capsule shown in FIG. 6.
Figure 9:
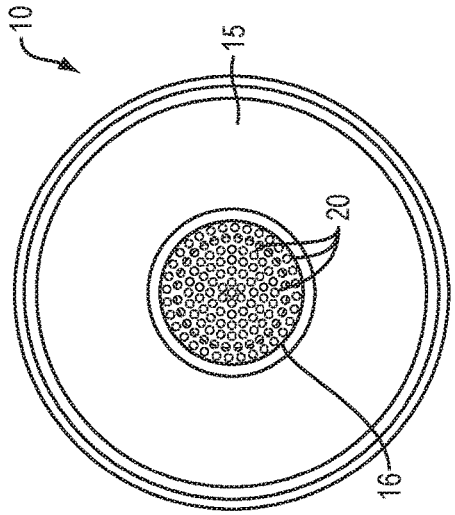
FIG. 9 is a bottom view of the filter capsule shown in FIG. 6.

Referring to FIGS. 6-11, in one aspect of the disclosure, a filter capsule designated generally as 10 includes a capsule wall 12, an integral or modular top cap 13 secured to the capsule wall and an integral or modular bottom cap 15 secured to a bottom end of wall 12 that combined, define a filter cavity adapted to receive a filter 19 or filter cartridge 18. For modular versions of the caps, sonic welding, adhesives or other methods used in the art to secure polymer-based materials are used to secure the components together. At least one of the caps should be modular to permit access to the filter cavity. Alternatively, the surfaces of the components can be constructed with releasably interlocking features to permit the removal of one or more caps from the wall to permit replacement of the enclosed filter and/or filter capsule. Interlocking tabs and slots are illustrative, non-limiting examples.

A modular or integral inlet port 14 extends upwardly from top cap 13 and defines an inlet bore in fluid communication with the filter cavity. Inlet port 14 may include one or more annular channels and/or flanges along its length to accommodate connectors affixed or extending from a shower arm or a faucet as well as optional sealing components, e.g., O-rings, to create a fluid-tight seal between filter capsule 10 and the fixture to which it is attached. The generally cylindrical shape of inlet 14 permits rotation of the filter capsule about a longitudinal axis of the capsule. For embodiments with offset outlet features, disclosed in more detail below, rotation of the filter capsule permits control over the direction of fluid flow from the capsule.

Portions of bottom cap 15 define an outlet bore that permits fluid transfer out of the capsule. Secured to, or integral with, bottom cap 15 is an outlet insert 16 that has a convex profile in cross section. Bottom cap 15 is positioned over the outlet bore and functions to restrict and direct fluid flow from the capsule. A plurality of perforations or fluid bores 20 are formed in insert 16 to permit fluid egress from the capsule. Bores 20 may have any regular or irregular geometric shape, e.g., circular, square, ovoid, star-shaped, etc., and may be arranged in annular concentric rows, in random patterns, staggered patterns and the like. A perimeter edge of insert 16, when in modular form, is secured to bottom surface of bottom cap 15. The convex shape of insert 16 may be hem i-spherical, partially spherical, parabolic, undulating, or constructed with any curvature that may or may not be defined by a polynomial equation.

Figure 17:
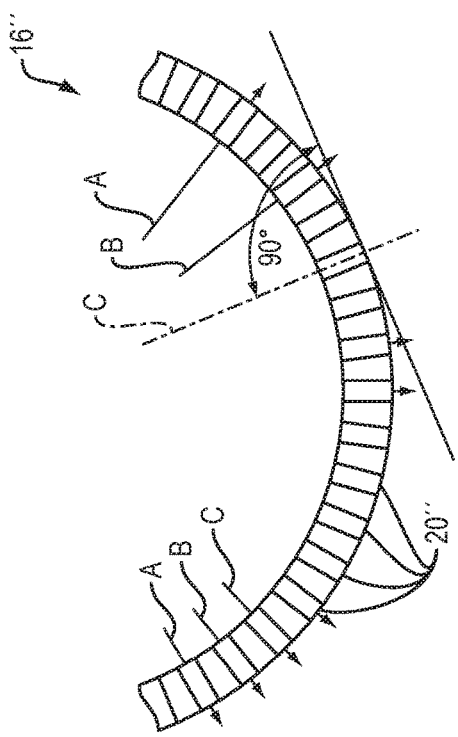
FIG. 17 is a side sectional view of a curved outlet insert according to one embodiment of the disclosure.

Each perforation or fluid bore 20 extends through the thickness of insert 16 and may have a central axis aligned orthogonal to a tangent line that intersects the insert surface at the location of the bore as shown in FIG. 17 and as disclosed more fully herein. Each bore 20 may also be oriented relative to the insert surface to create divergent, convergent, or combination divergent and convergent fluid flow patterns in combination with the other bores as disclosed in more detail below.

For embodiments with a modular bottom end cap 15, a filter 19 and/or filter cartridge 18 is inserted into filter capsule 10 from an open bottom end of wall 12. The filter or filter cartridge may be secured in the capsule with conventional attachment means such as post and corresponding post-receiving bores, or shoulders, with or without O-ring seals or similar seals. The filter or filter cartridge may also be permanently secured to the inside of the capsule via sonic welding, thermal welding, adhesive and the like.

Referring now to FIGS. 12-16, in another aspect of the disclosure, a filter capsule designated generally as 10' includes a capsule wall 12', an integral or modular top cap 13' secured to the capsule wall and an integral or modular bottom cap 15' secured to a bottom end of wall 12' that combined, define a filter cavity adapted to receive a filter 19' or filter cartridge 18'. As used herein, differently primed or unprimed reference characters correspond to different embodiments of the same element. For modular versions of the caps, sonic welding, thermal welding, adhesives or other methods used in the art to secure polymer-based materials are used to secure the components together. At least one of the caps should be modular to permit access to the filter cavity. Alternatively, the surfaces of the components can be constructed with releasably interlocking features to permit the removal of one or more caps from the wall to permit replacement of the enclosed filter and/or filter capsule.

A modular or integral inlet port 14' extends upwardly from top cap 13' and defines an inlet bore in fluid communication with the filter cavity. Inlet port 14' may include one or more annular channels and/or flanges along its length to accommodate connectors affixed or extending from a shower arm or a faucet as well as optional sealing components, e.g., O-rings, to create a fluid-tight seal between filter capsule 10' and the fixture to which it is attached. The generally cylindrical shape of inlet 14' permits rotation of the filter capsule about a longitudinal axis of the capsule.

Portions of bottom cap 15' define an outlet bore that permits fluid transfer out of the capsule. Secured to, or integral with, bottom cap 15' is an outlet insert 16' that has a concave profile in cross section. The apex of the insert is set within the body of filter capsule 10' and occludes the outlet bore. By being positioned within the outlet bore, outlet insert 16' functions to restrict and direct fluid flow from the capsule. A plurality of perforations or fluid bores 20' are formed in insert 16' to permit fluid egress from the capsule. Bores 20' may have any regular or irregular geometric shape, e.g., circular, square, ovoid, star-shaped, etc., and may be arranged in annular concentric rows, in random patterns, staggered patterns and the like. A perimeter edge of insert 16', when in modular form, is secured to bottom surface of bottom cap 15'. The convex shape of insert 16' may be hemi-spherical, partially spherical, parabolic, undulating, or constructed with any curvature that may or may not be defined by a polynomial equation.

Each perforation or fluid bore 20' extends through the thickness of insert 16' and may have a central axis aligned orthogonal to a tangent line that intersects the insert surface at the location of the bore as shown in FIG. 17 and as disclosed more fully herein. Each bore 20' may also be oriented relative to the insert surface to create divergent, convergent, or combination divergent and convergent fluid flow patterns in combination with the other bores as disclosed in more detail below.

For embodiments with a modular bottom end cap 15', a filter 19' and/or filter cartridge 18' is inserted into filter capsule 10' from an open bottom end of wall 12'. The filter or filter cartridge may be secured in the capsule with conventional attachment means such as post and corresponding post-receiving bores, or shoulders, with or without O-ring seals or similar seals. The filter or filter cartridge may also be permanently secured to the inside of the capsule via sonic welding, thermal welding, adhesive and the like.

Figure 17A:
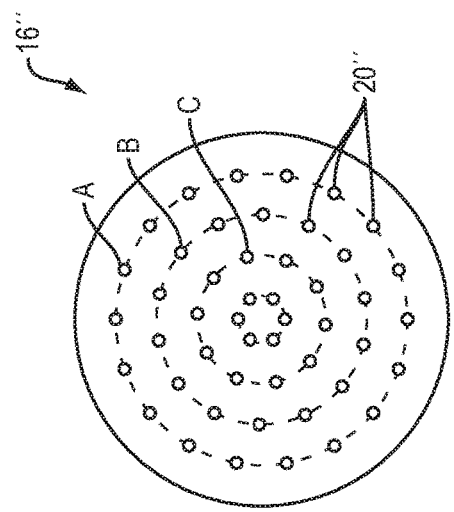
FIG. 17a is a bottom view of the curved outlet insert shown in FIG. 17.

Referring now to FIGS. 17 and 17a, in a further aspect of the disclosure, an outlet insert designated generally as 16" include a plurality of fluid bores 20", each of which has an axis aligned orthogonally relative to a tangent line intersecting the surface of insert 16" at the point of the subject fluid bore as shown in FIG. 17. Bores 20" are arranged in concentric rows designated A, B, C, etc. It should be understood that the number of bore rows can be increased or decreased and that the bores can be arranged in other orientations including illustratively staggered rows, linear row patterns, square patterns and the like. The configuration shown creates a divergent flow pattern, the breadth of which is determined by the severity of the outlet insert curvature. A more angular curvature will result in a broader spray pattern and vice versa.

Figure 18:
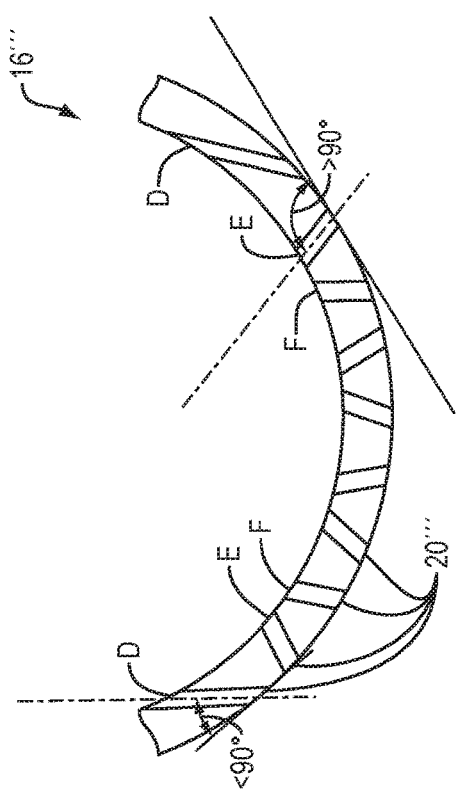
FIG. 18 is a side sectional view of a curved outlet insert according to another embodiment of the disclosure.
Figure 18A:
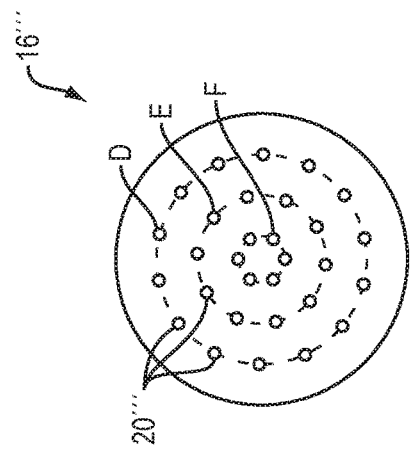
FIG. 18a is a bottom view of the curved outlet insert shown in FIG. 18.

Referring now to FIGS. 18 and 18a, in another aspect of the disclosure, an outlet insert designated generally as 16" include a plurality of fluid bores 20''', each placed within one of a plurality of concentric rows designated D, E, F, etc. In this embodiment, each fluid bore located in outer row D has an axis that forms an acute angle with its corresponding tangent line. A second set of fluid bores located in row E each have axes that form obtuse angles with their corresponding tangent lines. A third row of fluid bores F has fluid bores with axes that form acute angles with their corresponding tangent lines. This pattern of bore orientations creates offsetting convergent and divergent circular fluid flow patterns that interact to control the overall fluid flow pattern so as to reduce the splash parameters. It should be understood that the alternating pattern of bore axis orientations can be changed in multiple ways including illustratively, two diverging pattern rows with two inner converging pattern rows, etc.

Figure 19:
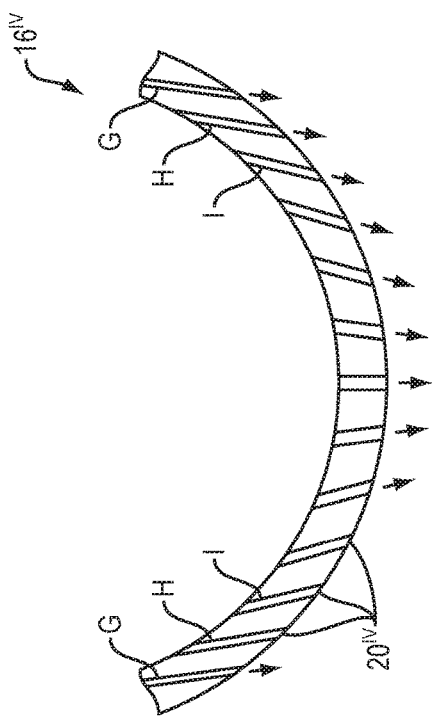
FIG. 19 is a side sectional view of a curved outlet insert according to yet another embodiment of the disclosure.
Figure 19A:
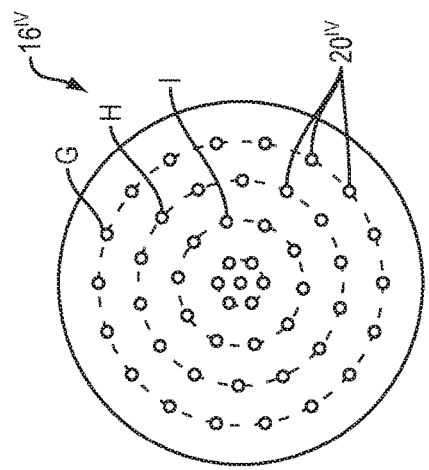
FIG. 19a is a bottom view of the curved outlet insert shown in FIG. 19.

Referring now to FIGS. 19 and 19a, in another aspect of the disclosure, an outlet insert designated generally as $16^{iv}$ include a plurality of fluid bores $20^{iv}$, each placed within one of a plurality of concentric rows designated G, H, I, etc. In this embodiment, each fluid bore regardless of which row it is located (except the bore, if present, located at the apex of the outlet insert) will form an acute angle with its corresponding tangent to create a convergent flow pattern towards the apex of the outlet insert. In like fashion to the other embodiments, the number of rows and bore cross-sectional dimension and shape can be altered and still result in the same essential function to create converging streams of fluids exiting from the bores to create a single column of fluid exiting the filter capsule.

Figure 20:
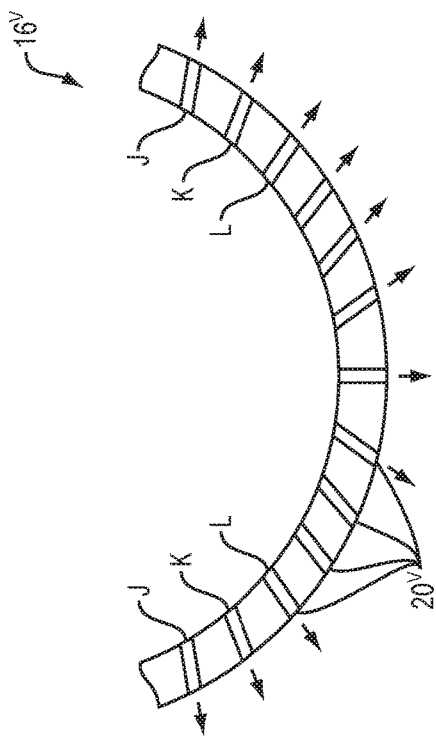
FIG. 20 is a side sectional view of a curved outlet insert according to a further embodiment of the disclosure.
Figure 20A:
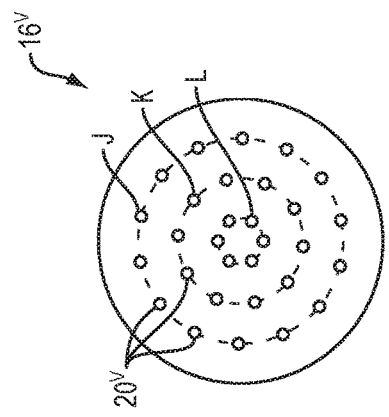
FIG. 20a is a bottom view of the curved outlet insert shown in FIG. 20.

Referring now to FIGS. 20 and 20a, in another aspect of the disclosure, an outlet insert designated generally as $16^{v}$ include a plurality of fluid bores $20^{v}$, each placed within one of a plurality of concentric rows designated J, K, L, etc. In this embodiment, each fluid bore regardless of which row it is located (except the bore, if present, located at the apex of the outlet insert) will form an obtuse angle with its corresponding tangent to create a divergent flow pattern away from the apex of the outlet insert. In like fashion to the other embodiments, the number of rows and bore cross-sectional dimension and shape can be altered and still result in the same essential function to create diverging streams of fluids exiting from the bores to create a dispersed fluid column exiting the filter capsule.

Figure 21:
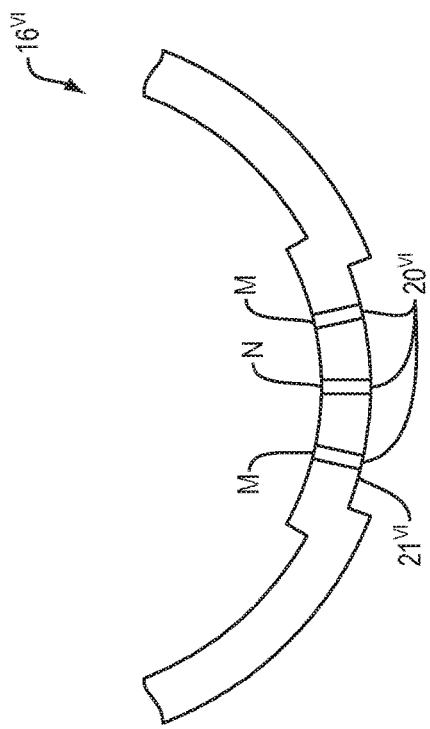
FIG. 21 is a side sectional view of a modified curved outlet insert according to a still further embodiment of the disclosure.
Figure 21A:
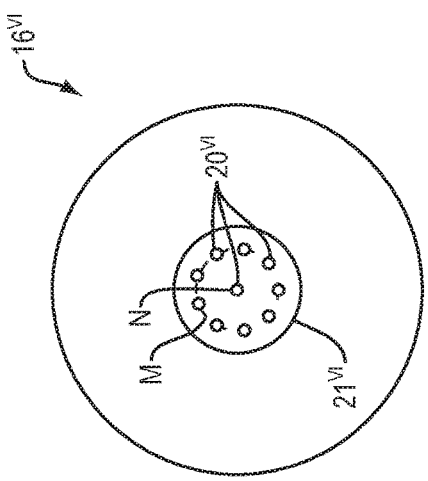
FIG. 21a is a bottom view of the curved outlet insert shown in FIG. 21.

Referring now to FIGS. 21 and 21a, in another aspect of the disclosure, an outlet insert designated generally as $16^{vi}$ include a plurality of fluid bores $20^{vi}$, each placed within one of a plurality of concentric rows designated M and N. In this embodiment, a central circular section $21^{vi}$ of insert $16^{vi}$ is recessed from the surface of the insert. Fluid bores $21^{vi}$ are formed in section $21^{vi}$ and have axes orthogonal to each bore's respective tangent line. This embodiment creates a limited divergent spray pattern that is partially controlled by the walls forming the inset intersection of the insert surface and section $21^{vi}$. Although this embodiment does not include fluid bores in the remaining surface of the insert, it should be understood that fluid bores in any of the spatial arrangements and individual bore orientations disclosed herein may be formed in the remaining surface. It also should be understood that fluid bores may be formed in any spatial arrangement and orientation on the insert surface and none formed in section $21^{vi}$.

Figure 22:
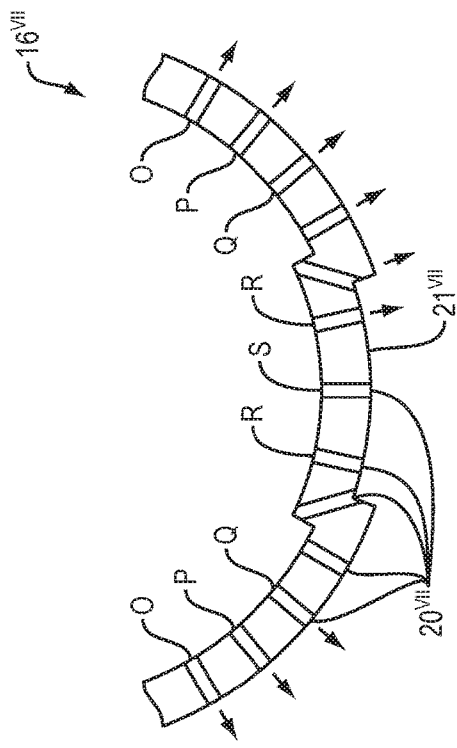
FIG. 22 is a side sectional view of another modified curved outlet insert according to a yet further embodiment of the disclosure.
Figure 22A:
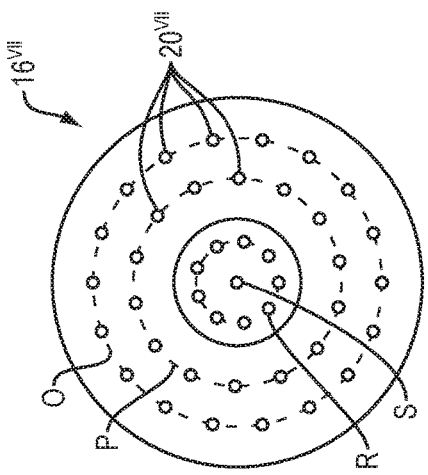
FIG. 22a is a bottom view of the curved outlet insert shown in FIG. 22.

Referring now to FIGS. 22 and 22a, in another aspect of the disclosure, an outlet insert designated generally as $16^{vii}$ include a plurality of fluid bores $20^{vii}$, each placed within one of a plurality of concentric rows designated P, O, etc. Like the embodiment shown in FIGS. 21 and 21a, a central circular section $21^{vii}$ of insert $16^{vii}$ is recessed from the surface of the insert in this embodiment. Fluid bores $20^{vii}$ formed in section $21^{vii}$ and have orientations to create convergent fluid streams and are set in concentric rows designated R and S. Fluid bores formed in the remaining surface of insert $16^{vii}$ are set in concentric rows designated O, P, Q, etc., and are oriented to create divergent fluid streams. It should be understood that the orientations of the fluid bores in section $21^{vii}$ and the remaining insert surface can be reversed so that the bores formed in section $21^{vii}$ can be oriented to form divergent fluid streams and the bores formed in the remaining insert surface can be oriented to form convergent fluid streams. It should be further understood that the concentric circle arrangement of bores can be altered as well as the cross-sectional dimensions to produce different fluid streams and overall fluid flow patterns.

Figure 23:
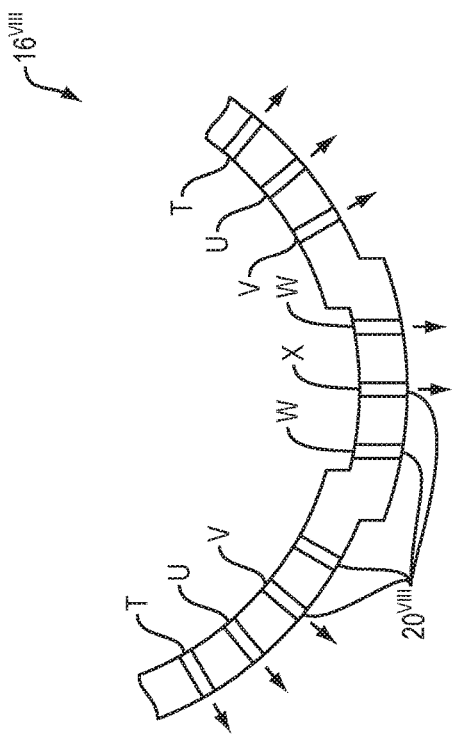
FIG. 23 is a side sectional view of a curved outlet insert with an extended center section according to another embodiment of the disclosure.
Figure 23A:
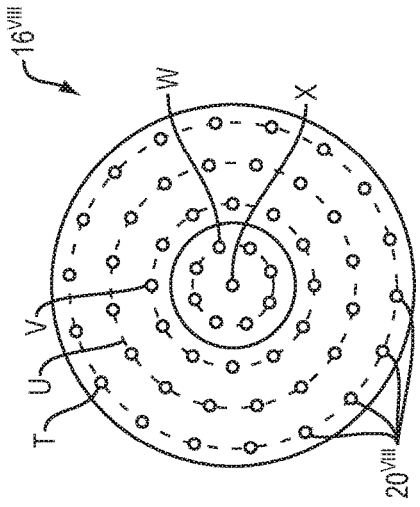
FIG. 23a is a bottom view of the curved outlet insert shown in FIG. 23.

Referring now to FIGS. 23 and 23a, in another aspect of the disclosure, an outlet insert designated generally as $16^{viii}$ include a plurality of fluid bores $20^{viii}$, each placed within one of a plurality of concentric rows designated T, U, V, etc. In this embodiment, a central circular section $21^{viii}$ of insert $16^{viii}$ extends outwardly or projects proud of the surface of the insert. Fluid bores $20^{viii}$ are formed in section $21^{viii}$ and have axes orthogonal to each bore's respective tangent line. The bores are positioned in concentric circles, or at the insert apex designated W and X, respectively. Bores formed in the remaining surface of insert $16^{viii}$ also have axes orthogonal to each bore's respective tangent line. This fluid bore configuration creates an overall divergent fluid flow pattern with the bores in section $21^{viii}$ creating a central essentially uniform flow pattern. It should be understood that the fluid bores may be formed in any spatial arrangement and individual orientation and cross-sectional dimension on surface $21^{viii}$ and/or the remaining surface of insert $16^{viii}$.

Figure 24:
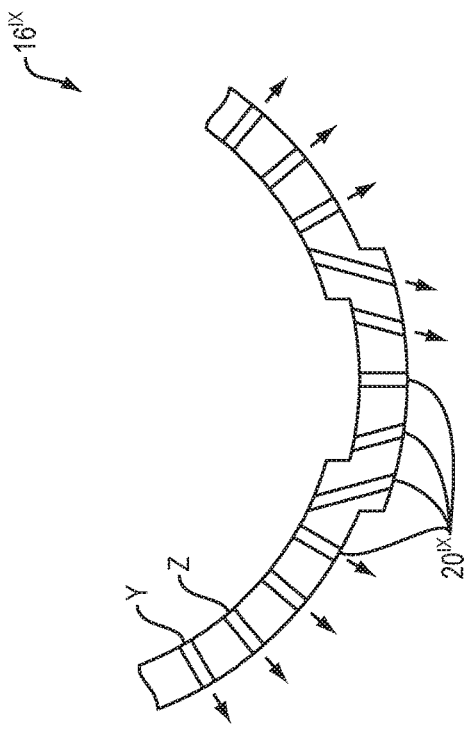
FIG. 24 is a side sectional view of a curved outlet insert with a modified extended center section according to yet another embodiment of the disclosure.
Figure 24A:
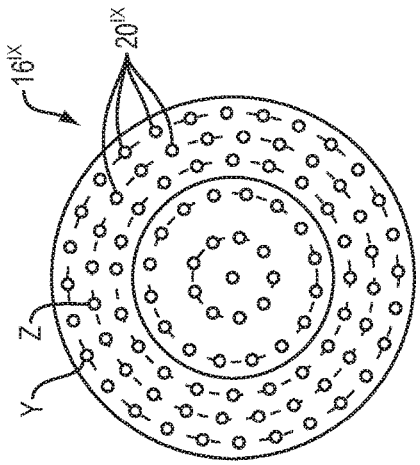
FIG. 24a is a bottom view of the curved outlet insert shown in FIG. 24.

Referring now to FIGS. 24 and 24a, in another aspect of the disclosure, an outlet insert designated generally as $16^{ix}$ include a plurality of fluid bores $20^{ix}$, each placed within one of a plurality of concentric rows designated Y, Z, etc. Like the embodiment shown in FIGS. 23 and 23a, a central circular section $21^{ix}$ of insert $16^{ix}$ projects from, or is proud of, the surface of the insert in this embodiment. Fluid bores $20^{ix}$ formed in section $21^{ix}$ and have orientations to create convergent fluid streams and are set in concentric rows. Fluid bores formed in the remaining surface of insert $16^{ix}$ are set in the concentric rows designated Y, Z, etc., and are oriented to create divergent fluid streams. It should be understood that the orientations of the fluid bores in section $21^{ix}$ and the remaining insert surface can be reversed so that the bores formed in section $21^{ix}$ can be oriented to form divergent fluid streams and the bores formed in the remaining insert surface can be oriented to form convergent fluid streams. It should be further understood that the concentric circle arrangement of bores can be altered as well as the cross-sectional dimensions and orientations of the fluid bores to produce different fluid streams and overall fluid flow patterns.

Figure 25:
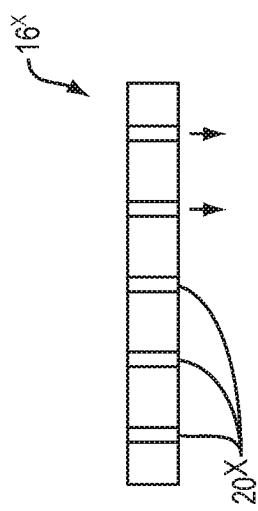
FIG. 25 is a side sectional view of a flat outlet insert according to a further embodiment of the disclosure.

Referring now to FIG. 25, in a further aspect of the disclosure, a flat outlet insert designated generally as $16^{x}$ has a plurality of fluid bores $20^{x}$ formed in the insert. This fluid bore pattern creates a straight, uniform flow pattern out of the filter capsule.

Figure 26:
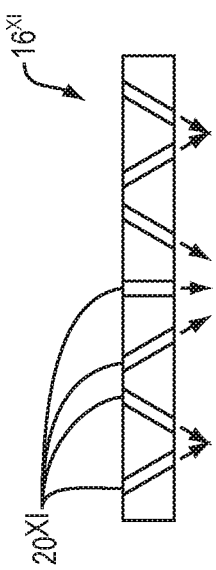
FIG. 26 is a side sectional view of a flat outlet insert with converging perforations according to a yet further embodiment of the disclosure.

Referring now to FIG. 26, in a still further aspect of the disclosure, a flat outlet insert designated generally as $16^{xi}$ has a plurality of fluid bores $20^{xi}$ formed in the insert. The orientation of the fluid bores alternates between convergent and divergent orientations relative to the insert center point. The alternating pattern of fluid bore orientations create offsetting fluid streams to control the overall fluid stream exiting the filter capsule. It should be understood that the pattern of fluid bores and individual fluid bore orientations can be altered to create different individual and overall flow patterns.

Figure 27:
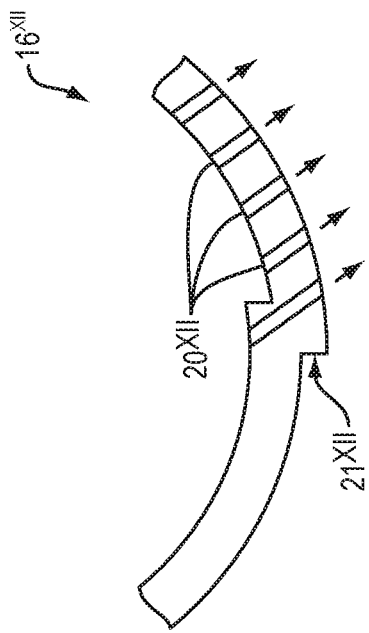
FIG. 27 is a side sectional view of an asymmetrically curved outlet insert according to a still further embodiment of the disclosure.
Figure 27A:
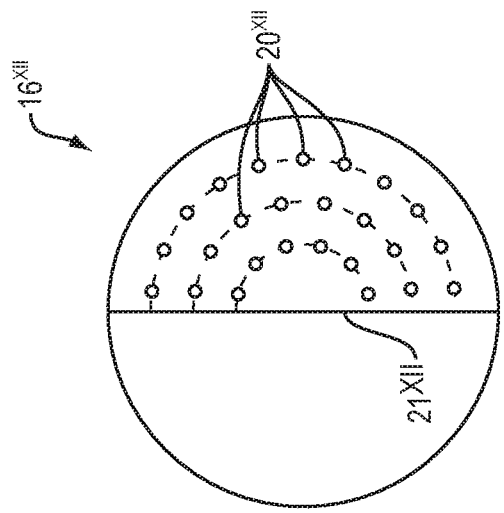
FIG. 27a is a bottom view of the asymmetrically curved outlet insert shown in FIG. 27.

Referring now to FIGS. 27 and 27a, in a yet further aspect of the disclosure, an outlet insert designated generally as $16^{xii}$ has a segment $21^{xii}$ extending or projecting from the surface of the insert to create an asymmetric insert. A plurality of fluid bores $20^{xii}$, each placed within one of a plurality of concentric rows on segment $21^{xii}$ with each fluid bore axis oriented orthogonal to its respective tangent line. This fluid bore pattern creates a slightly diverging flow pattern angularly offset from the insert center line. This configuration permits the user to rotate the capsule to direct the offset stream to a desired location. To further improve the directional control, the fluid bores can be oriented to be substantially parallel to form a uniform fluid flow offset from the capsule and insert center line.

It should be understood that the fluid bore arrangement as well as the individual cross-sectional dimension and orientation of the individual bores can be altered to create unique flow patterns with this asymmetric embodiment. It should be further understood that asymmetric convex insert $16^{xii}$ has a significant advantage with respect to splash control in that the direction of flow can be controlled by rotating the filter capsule about the inlet port without altering the spatial orientation of the filter capsule relative to the shower arm, faucet, or surrounding features such as shower stalls and sinks. Moreover, additional accessories, such as hoses attached to conventional outlet ports are not needed to control flow direction.

It further should be understood for any of the embodiments shown in FIGS. 19-24, 27 and 27a that the convex illustrations can be reversed or flipped to illustrate concave insert configurations. With the reversed configurations, any fluid bores designated to create divergent flow patterns will create convergent flow patterns in the reverse concave configuration, and any fluid bores designated to create convergent flow patterns will create divergent flow patterns in the concave configuration.

Figure 28:
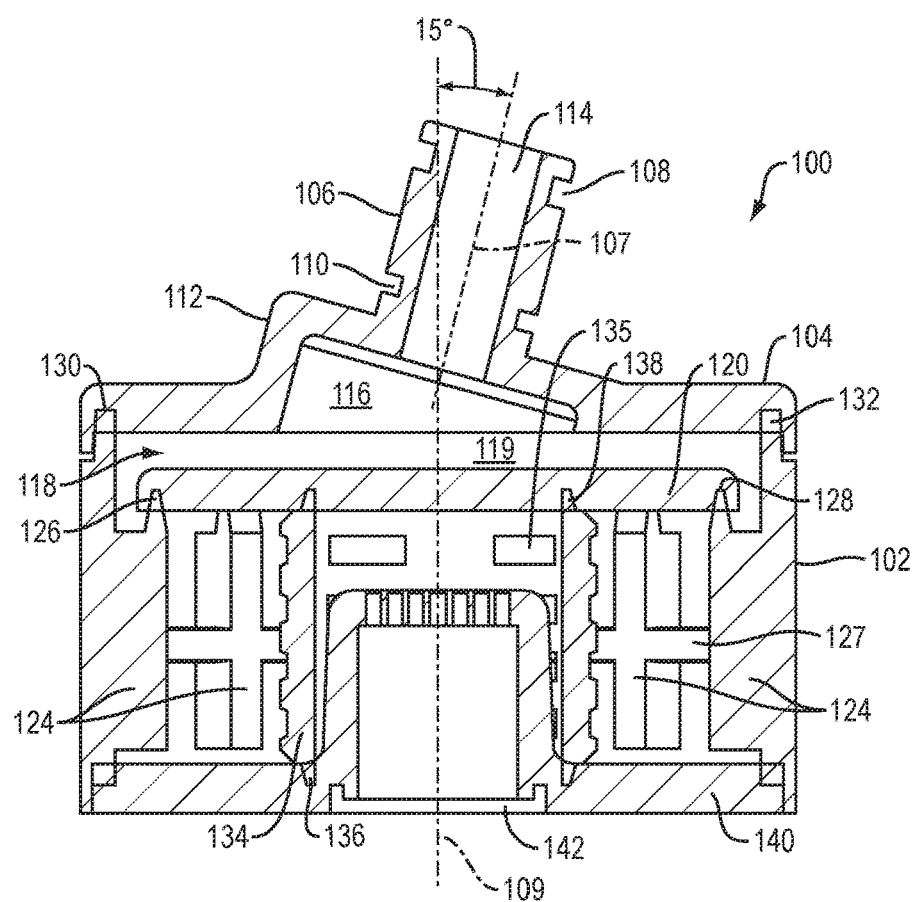
FIG. 28 is a side sectional view of a filter capsule with an offset inlet according to one embodiment of the disclosure.
Figure 29:
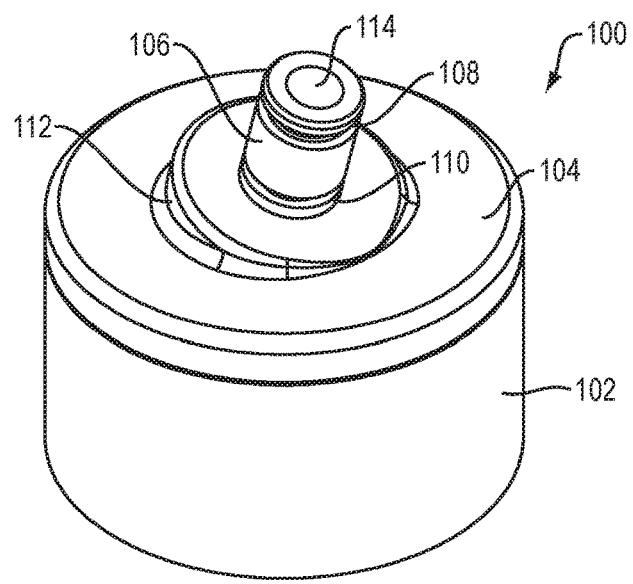
FIG. 29 is a top side perspective view of the filter capsule shown in FIG. 28.
Figure 30:
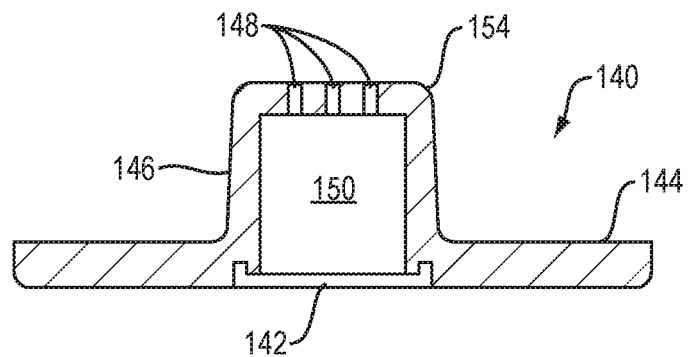
FIG. 30 is a side sectional view of an outlet insert for a filter capsule according to the embodiment of the disclosure shown in FIG. 28.
Figure 31:
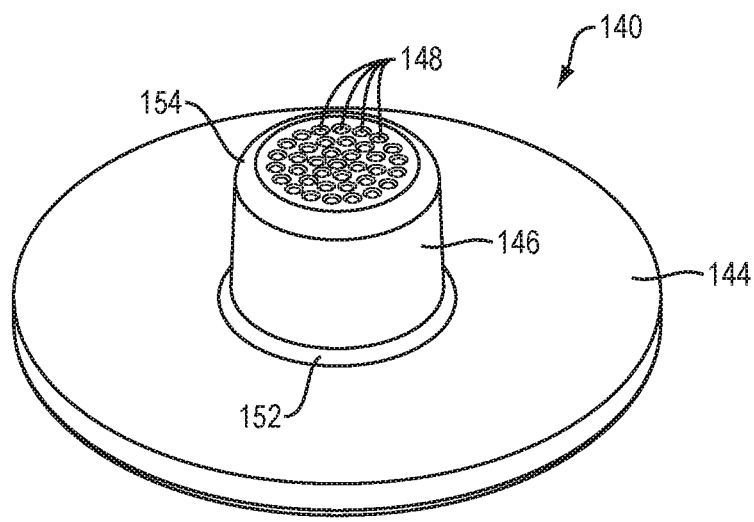
FIG. 31 is a top side perspective view of the outlet insert shown in FIG. 30.

Referring now to FIGS. 28-39, in a yet further aspect of the disclosure, a filter capsule designated generally as 100 includes a capsule body 102 that partially defines a capsule chamber 118 dimensioned to receive filter media and/or a filter cartridge disclosed in more detail below. A top capsule cap 104 is secured to a top end of capsule body 102 and further defines capsule chamber 118. An optional annular cap slot 130 is dimensioned to receive a top end of capsule body 102 disclosed in more detail below. An inlet port 106 extends upwardly from top capsule cap 104 and defines an inlet chamber 114. Port 106 has an axis 107 angularly offset from a capsule axis 109. A 15° offset angle is shown in FIG. 28 for illustrative purposes only. The offset angle can be increased or decreased to increase or decrease, respectively, the diameter of the circular flow pattern available with rotation of capsule 100 about its inlet connection as disclosed in more detail below.

A circular segment 112 of cap 104 is raised at an angle so that a plane occupied by a top surface of segment 112 is oriented orthogonal to port axis 107 to maintain cap thickness uniformity. A cap cavity 116 defined by segment 112 is in fluid communication with inlet port channel 114 and filter chamber 118. An upper annular O-ring channel 108 positioned near the port upper end is dimensioned to receive an O-ring (not shown) to seal against the fluid source. A lower annular O-ring channel 110 positioned near the port lower end is dimensioned to receive a second O-ring (not shown) to also seal against the fluid source. The dual registration surfaces provide a stable cylindrical connection for the capsule and permit rotation about the inlet connection point to the fluid source.

Figure 32:
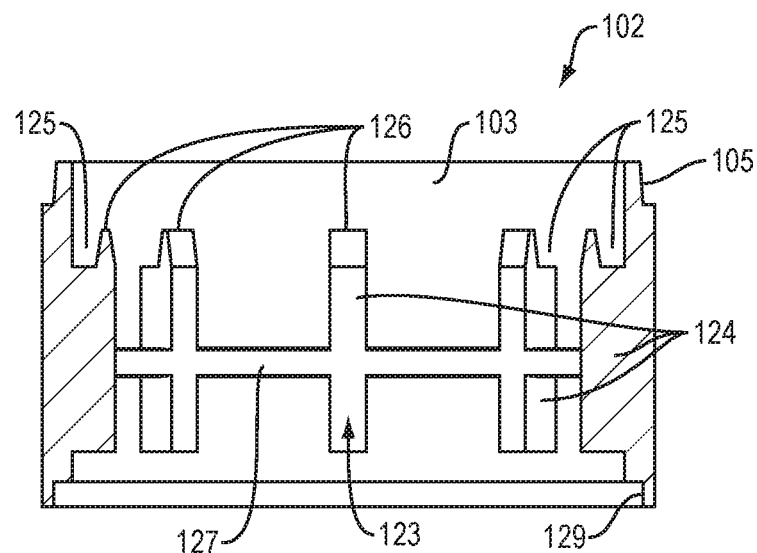
FIG. 32 is a side partial sectional view of a filter capsule insert according to the embodiment of the disclosure shown in FIG. 28.
Figure 33:
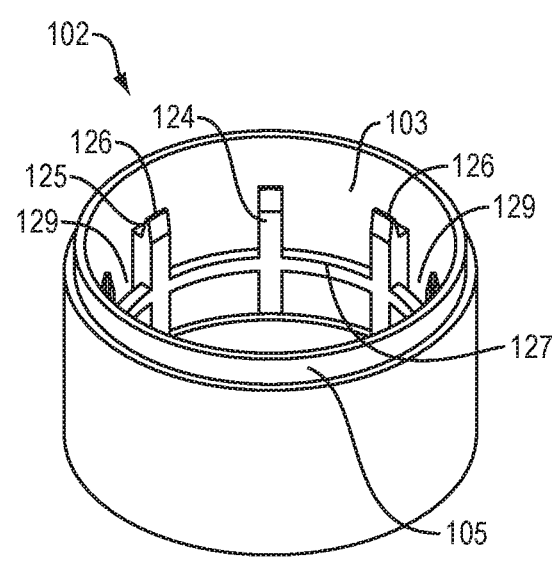
FIG. 33 is a top side perspective view of the filter capsule insert shown in FIG. 32.

Referring now to FIGS. 32 and 33, capsule body 102 has an inner wall 103 that partially defines filter chamber 118. An annular channel 105 formed on an outer surface at an upper end of body 102 is dimensioned to receive top cap 104. Channel 105 reduces the thickness of upper capsule end 132 to a dimension needed to fit within and register against optional cap slot 130. The shoulder partially defining the channel provides a structurally supportive registration surface for a perimeter edge of top cap 104. The overlapping registration surfaces improve the fluid tight bond between the mating components when thermally or sonically bonded.

Formed on, and projecting radially inwardly from, an inner surface 103 of capsule body wall 102 is a filter cartridge support ring 123 comprising a plurality of cartridge cap support columns 124 positioned around the inner wall surface in equally spaced or variably spaced configurations. The number and spacing of columns can vary to accommodate differently dimensioned capsules and enclosed cartridges and/or filter media. At least two columns are needed to support a cartridge cap disclosed in more detail below. Each column 124 extends radially inwardly from inner wall 103 and has a bottom end proximal to, but spaced away from, the plane occupied by the bottom annular end of body 102. This prevents the columns from potentially interfering with the connection of a recessed outlet 140 disclosed in more detail below.

Each column 124 forms an optional tapered column top end 126 set below annular upper capsule wall end 132. The smaller dimensioned end of the taper may fit within an optional annular channel formed in a cartridge cap disclosed in more detail below. The distance between the column top ends and capsule end 132 is set to permit reception of the cartridge cap so as to leave a gap 119 between the cartridge cap top surface and bottom surface of capsule cap 104. Gap 119 is in fluid communication with inlet channel 114 and capsule chamber 118 to permit the flow of incoming fluids from the inlet to access the enclosed filter media and/or filter cartridge in capsule chamber 118. Each column 124 has portions defining a cartridge cap receiving shoulder 125 that receives a peripheral edge of the cartridge cap. This construction provides a mechanical means to support and secure the cartridge cap prior to thermal or sonic bonding. It should be understood that the means used to join any of the polymeric-based capsule and/or filter cartridge components can be any method commonly used in the art and are not limited to thermal or sonic bonding. Illustratively, chemical bonding may also be used to construct the capsule and/or enclosed cartridge.

A filter support ring 127 is formed around the capsule filter chamber and intersects each column 124. A radially outer edge of ring 127 is spaced away from inner wall 103 to create fluid flow channels between columns 124. The radially inner edge of ring 127 provides mechanical support for any filter media secured in the capsule, particularly pleated filter constructions, to ensure the pleats remain properly positioned against the enclosed filter core 134. Ring 127 may be positioned equidistant between the top and bottom ends of the columns, or may be positioned anywhere between the column top and bottom ends to accommodate and support particular filter membrane and/or filter media materials and configurations.

Referring now to FIGS. 30, 31 and 36-39, a recessed outlet 140 is shown. Outlet 140 is structured with an annular recess wall 146 with an outlet end 154 formed at the top end of wall 146. At least one or a plurality of fluid apertures or bores 148 are formed in outlet end 154. Outlet wall 146 may have a slight taper from bottom to top with the top end being the smaller end of the taper. This facilitates insertion of a filter cartridge with the filter cartridge core 134 superposed about recessed outlet 140.

An outlet flange 144 extends radially outwardly from a bottom end of wall 146. Flange 144 functions as an end cap for the enclosed filter cartridge core 134 and as an end cap for filter capsule 100 via registration against a bottom end of wall 102. An annular channel 142 is formed on a bottom surface of outlet flange 144 proximal to the outlet opening at the bottom of wall 146 to function as a drip edge to prevent fluids flowing out of the outlet to migrate along the contact surfaces of flange 144. Any droplets migrating radially outwardly along the flange bottom surface will collect in channel 142 and form into larger droplets that will drip downwardly off the flange via gravity. This construction reduces the potential spread of contaminants to contact surfaces on the capsule outlet.

Similar to other embodiments disclosed herein, fluid apertures 148 may be arranged and oriented in a variety of patterns to impart a particular fluid flow pattern. Illustratively, the apertures may be arranged in concentric circles, rows and columns, staggered rows, crossing rows, undulating rows, serpentine arrangements, etc. Aperture extensions may also be included for one or more of the apertures. The aperture orientations may be arranged to be uniformly diverging, uniformly converging, combinations of converging and diverging orientations as well as any variable pattern to impart specific flow patterns to fluids exiting the outlet.

Referring again to FIG. 28, a circular filter cartridge cap 120 is secured to a top end of the filter cartridge core 134 at core upper end 138. A core bottom end 136 is secured into a top surface of outlet flange 144. Cartridge cap 120 is secured to tapered column top ends 126 proximal to the perimeter of cap 120. The diameter of cap 120 is set to be smaller than the cross-sectional diameter of filter capsule chamber 118 so as to create an annular gap between inner wall 103 and cap 120. This creates a fluid flow path from inlet channel 114 around cap 120, between columns 124 and into the pleated folds of an enclosed pleated filter or other filter media secured in capsule chamber 118. The segmented gaps formed between the columns and the outer edge of ring 127 permit unprocessed fluids flowing into the chamber to reach the bottom end of the enclosed pleated filter or other filter media.

Fluid processed through the filter membrane and/or filter media flows through filter core 134 via core slots 135 positioned around and along the length of core 134. It should be understood that the size, number, individual slot geometric configuration and distribution pattern of slots 135 can be modified to accommodate different filter membranes and/or media.

The combination of an inner wall of core 134, a bottom surface of cartridge cap 120, outlet flange 144 and outlet wall 146 create a downstream chamber isolated from an upstream chamber defined by inner wall 103, capsule top cap 104 and the portions of outlet flange 144 radially outside the outer wall of core 134. The only fluid communication between the upstream chamber and the downstream chamber are the core slots 135. Positive fluid pressure originating at the capsule inlet creates a pressure gradient that urges incoming fluid to enter the upstream chamber, flow through the filter membrane and/or filter media and into the downstream chamber via slots 135 in core 134.

To construct filter capsule 100, recessed outlet 140 is positioned registered against the bottom end of capsule wall 102. Outlet 140 may be secured to wall 102 at this time via thermal or sonic bonding wherein the wall and outlet polymeric materials are placed in a molten condition to bond together. Pressure applied against the registered components may be used to further secure the components together. Alternatively, the assembled filter cartridge or any filter media secured to filter core 134 may be inserted into capsule chamber 118 and registered against a top surface of flange 144. The inner wall of core 134 should surround wall 146 of recessed outlet 140. The combination of capsule wall 103, recessed outlet 140 and cartridge core 134 may now be bonded together in the manner previously disclosed.

Cartridge cap 120 is now positioned in capsule chamber 118 with the bottom surface of the cap registered against column ends 126 and core upper end 138. In an alternative embodiment, cap 120 may be formed with an annular capsule receiving channel 128 to receive column top ends 126. With or without receiving channel 128, the cap may be placed on these registration points in a molten condition with pressure to urge the column and core upper ends to merge into the cap material to create a fluid tight bond. Alternatively, the cartridge cap can be converted to a molten form after placement on the registration points via thermal or sonic bonding, or other suitable bonding means.

With the filter cartridge and/or filter media secured in capsule chamber 118, top cap 104 is placed on capsule wall 102 and bonded to the wall via thermal or sonic bonding, with, or without, pressure applied to the top cap during the bonding process. If optional channel 130 is present, capsule wall top end 132 is urged into channel 130 and thereafter bonded together as disclosed herein. Any accessory components, e.g., O-rings can be placed as required after the bonding processes are complete. It should be understood that the capsule construction process disclosed herein is for illustrative purposes only and that other assembly sequences and methods can be used and remain within the spirit and scope of this disclosure.

Figure 34:
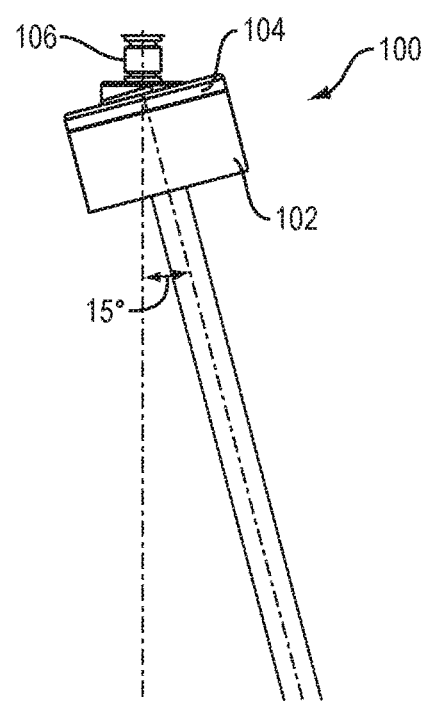
FIG. 34 is a side view of the filter capsule with offset inlet shown in FIG. 28.
Figure 37:
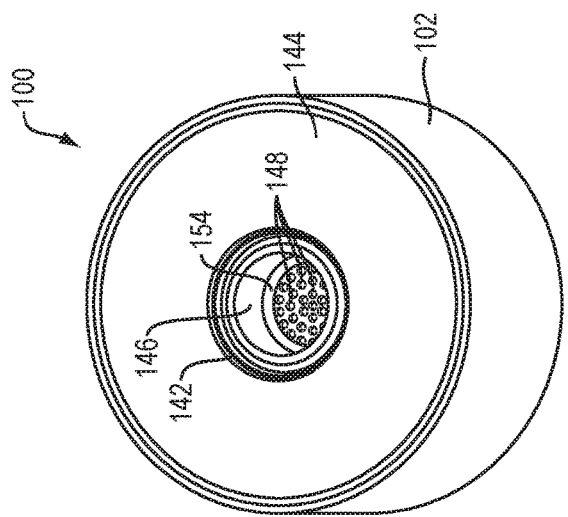
FIG. 37 is a bottom side perspective view of the filter capsule with offset inlet shown in FIG. 28.
Figure 35:
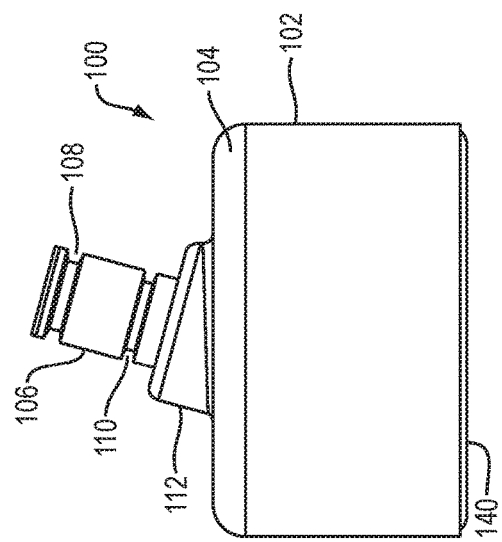
FIG. 35 is a side view in elevation of the filter capsule with offset inlet shown in FIG. 28.
Figure 36:
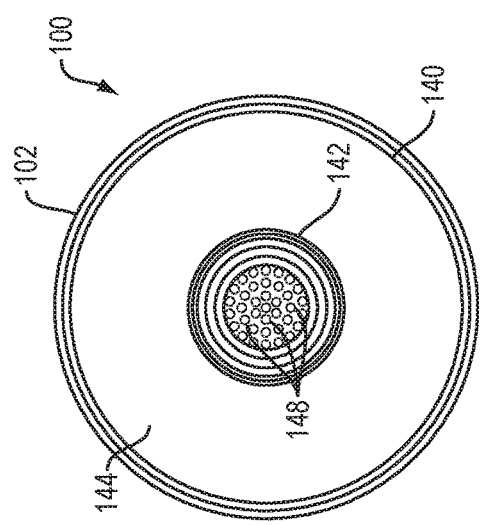
FIG. 36 is a bottom view of the filter capsule with offset inlet shown in FIG. 28.
Figure 38:
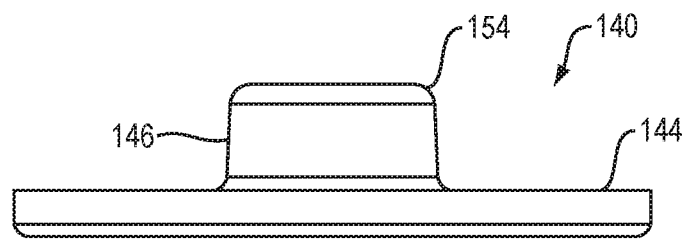
FIG. 38 is a side view in elevation of the outlet insert shown in FIG. 30.
Figure 39:
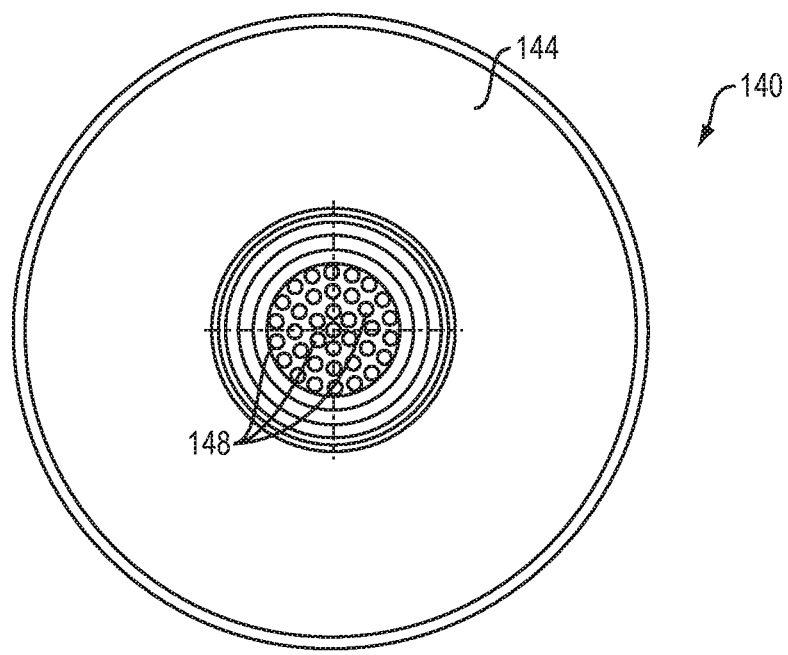
FIG. 39 is a top plan view of the outlet insert shown in FIG. 30.

Referring now to FIG. 34, assembled filter capsule 100 will project a fluid flow path offset from the axis of the inlet connection point. This permits the user to orient the flow path to fall on a specific surface within a container, e.g., a sink or shower shall, that will minimize splash and the potential spread of contaminants. For example, the stream can be directed away from the sink drain where contaminants are likely to reside and be subject to dispersal from the direct impact of a forceful stream of fluid. This is accomplished by rotating capsule 100 about the inlet connection that rotates the inlet within the fluid source connector.

The possible fluid flow strike points describe a circular pattern, the diameter of which can be increased, or decreased by increasing or decreasing, respectively, the angular offset of the inlet axis relative to the capsule longitudinal axis. Illustratively, if the offset is 15° as shown, the potential flow pattern will describe a circular flow pattern that can be altered from a maximum diameter via the application of a threshold fluid pressure, or a reduced diameter pattern, if the pressure is reduced enough to permit gravity to alter the flow pattern toward the inlet axis. If the offset is increased, e.g., 30°, the maximum diameter of the flow pattern will be greater than the maximum diameter of the 15° offset capsule at the same fluid pressure. The offset angle can range from about 1° to about 50°. In sum, the offset angle and/or the fluid pressure can be altered to alter the potential flow pattern and fluid strike points available with rotation of the capsule about the inlet connection.

Referring now to FIGS. 40-46, in yet another aspect of the disclosure, a filter capsule designated generally as 100' includes an integral capsule body and top end designated generally as 102' that partially defines a capsule chamber 118' dimensioned to receive filter media and/or a filter cartridge disclosed in more detail below. For purposes of this disclosure, the capsule top end is designated 104'. It should be understood that top end 104' may be formed as a modular component secured to capsule body 102' to provide the same function as the integral top end illustrated in FIG. 40. An inlet port 106' extends upwardly from top end 104' and defines an inlet chamber 114'.

Figure 40:
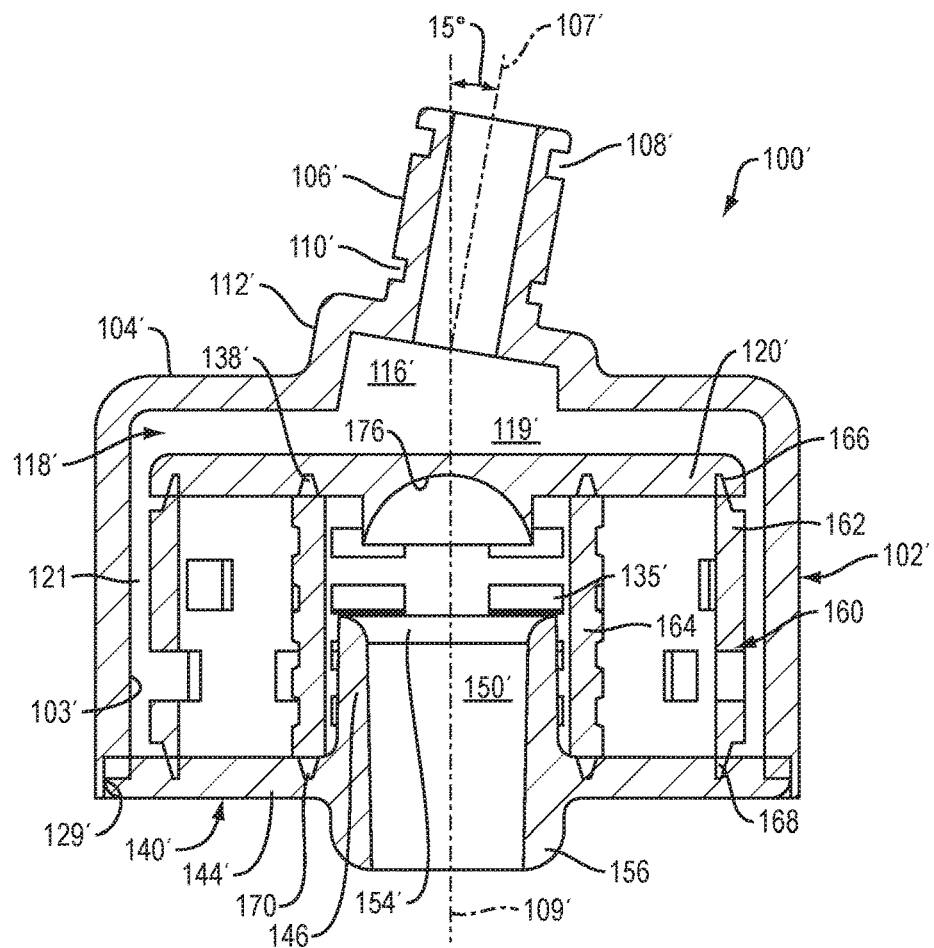
FIG. 40 is a side section view in elevation of a filter capsule with an offset inlet and an outlet splash protection insert according to a yet further embodiment of the disclosure.
Figure 41:
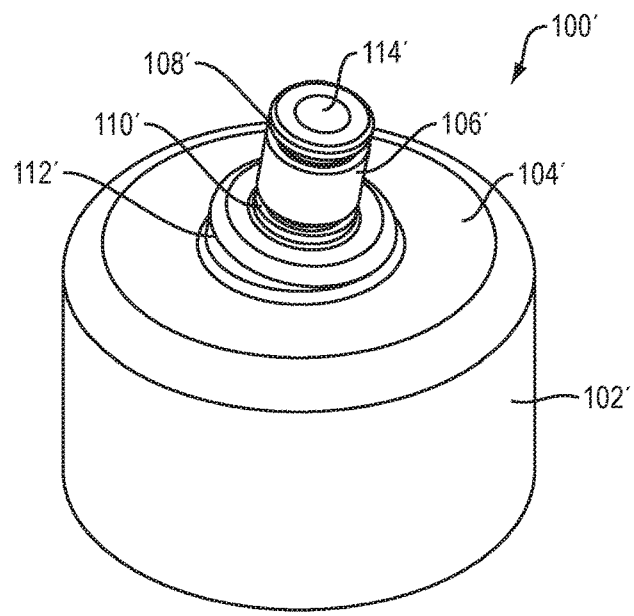
FIG. 41 is a top side perspective view of the filter capsule shown in FIG. 40.

Port 106' has an axis 107' angularly offset from a capsule longitudinal axis 109'. A 15° offset angle is shown in FIG. 40 for illustrative purposes only. The offset angle can be increased or decreased to increase or decrease, respectively, the diameter of the circular flow pattern available with rotation of capsule 100' about its inlet connection as disclosed in more detail below. In an illustrative range, the offset angle may be set from about 1° to about 50°. Surprisingly, the use of an outlet offset angle provides superior fluid flow directional control without compromising limited spatial requirements in certain applications and settings, such as sinks in surgical pre-op stations.

A circular segment 112' of top end 104' is raised at an angle so that a plane occupied by a top surface of segment 112' is oriented orthogonal to inlet port axis 107' to maintain cap thickness uniformity. A cap cavity 116' defined by segment 112' is in fluid communication with inlet port channel 114' and filter chamber 118'. An upper annular O-ring channel 108' positioned near the port upper end is dimensioned to receive an O-ring (not shown) to seal against the fluid source. A lower annular O-ring channel 110' positioned near the port lower end is dimensioned to receive a second O-ring (not shown) to also seal against the fluid source, e.g., a supply tube or hose. The dual registration surfaces provide a stable cylindrical connection for the capsule and permit rotation about the inlet connection point to the fluid source.

Referring more specifically to FIG. 40, capsule body/top 102' has an optional annular channel 129' formed on a bottom end of the capsule wall to receive an annular edge of recessed outlet 140' (and associated filter cartridge subassembly disclosed herein) so as to create mechanical interlocking surfaces. Once joined, the surfaces may be bonded via conventional bonding methods disclosed herein. Alternatively, the channel may be eliminated and the outlet secured to the bottom edge of the capsule wall via registered, non-mechanically locking surfaces using conventional methods such as thermal bonding.

Unlike previously disclosed embodiments, filter capsule 100' is formed with a modular filter cartridge subassembly, designated generally as 160, secured in the filter capsule via a connection exclusively to a flange of recessed outlet 140' disclosed in more detail below. This modular configuration facilitates capsule production and maximizes fluid access to the enclosed filter media by maximizing the gap 121 between the capsule inner wall and a cartridge outer wall 162, disclosed in more detail below. This is made possible by eliminating the inwardly projecting columns 124 of filter capsule 100 to create an uninterrupted cylindrical gap about the filter cartridge. Outer cartridge wall 162 provides the same structural function as columns 124, i.e., to retain the enclosed filter media and to support filter cartridge cap 120'.

Filter cartridge subassembly 160 includes cartridge outer wall 162, a cartridge inner wall 164, a filter cartridge cap 120' and filter media enclosed in the cartridge subassembly. The filter media may take the form of a single toroidal filter, stacked discs, loose media and the like. Suitable materials to construct the filter media are disclosed below. The cartridge walls are spaced, have different cross-sectional diameters and are coaxially arranged. Outer cartridge wall 162 provides mechanical support for any filter media secured in the capsule, particularly pleated filter constructions, to ensure the pleats remain properly positioned against cartridge inner wall 164. An inner side of cartridge inner wall 164 defines a cartridge core dimensioned to receive portions of recessed outlet 140' as disclosed in more detail herein.

Both the inner and outer cartridge walls are formed as cage-like structures with columnar sections and rail-like sections that create discrete gaps or passages 135' to permit fluid transmission through the walls. Cartridge outer wall 162 permits the flow of unprocessed fluid into the enclosed filter media. Cartridge inner wall 164 permits the flow of processed fluid into the cartridge core and a core of the recessed outlet as disclosed in more detail below.

Cartridge cap 120' has an essentially disc-shaped body 172 with a downwardly extending, cylindrical cap extension 174 dimensioned to fit within, and optionally register against, the inner surface of cartridge inner wall 164 so as to occupy a top end of the cartridge core. An inner bottom surface 176 of cap extension 174 is formed as a concave surface to redirect any fluid, entering undesirably into the capsule from the outlet, toward the center of the cartridge core and out the outlet. This reduces or prevents potentially contaminated fluids, or other potential contaminants, inadvertently splashed or forced into the outlet, from contacting or migrating undesirably into the enclosed filter media.

The curvature of the bottom surface 176 may be adjusted by increasing or decreasing the curvature to impact the focal point toward which undesired fluids entering through the outlet will be directed. For example, a parabolic shaped surface will create one form of rebounding pattern while a more spherically shaped surface will create a different rebounding pattern. Whatever shape is selected, the orientation of the shape must be concave relative to the cartridge core to redirect the fluid, contaminant, etc., toward the center of the filter cartridge core and out the outlet.

A top surface of cartridge top 120' may be aligned substantially parallel with a bottom surface of capsule top end 104' so as to create a gap 119' to permit fluid to enter capsule chamber 118'. Gap 119' is in fluid communication with an inlet channel 114' and with capsule chamber 118'. Top 120' has a cross sectional diameter smaller than the cross-section diameter of chamber 118' that forms an annular gap 119' between the cartridge cap and capsule inner wall. This permits fluids to flow from gap 119' into the annular gap between the cartridge top and capsule wall and into a cylindrical gap 121 around the filter cartridge subassembly to access the enclosed filter media and/or filter cartridge in capsule chamber 118'.

To secure cartridge top cap 120' to the cartridge walls, each wall is formed with an optional tapered top end, 138' (inner wall) and 166 (outer wall), and each is bonded to the bottom surface of top cap 120'. The smaller dimensioned ends of each taper may be secured within optional annular channels (not shown) formed in the bottom surface of the cartridge cap. The channels, if present, are spaced to accommodate the spacing of the cartridge walls. This optional construction provides a mechanical means to support and secure the cartridge cap prior to thermal or sonic bonding to the walls.

Cap 120' may be placed on the wall top ends in a molten condition with pressure to urge the cartridge outer and inner walls to merge into the cap material to create a fluid tight bond. Alternatively, the cartridge cap can be converted to a molten form after placement on the registration points via thermal or sonic bonding, or other suitable bonding means. It should be understood that the means used to join any of the polymeric-based capsule and/or filter cartridge components can be any method commonly used in the art and are not limited to thermal or sonic bonding. Illustratively, chemical bonding may also be used to construct the capsule and/or enclosed cartridge.

Figure 42:
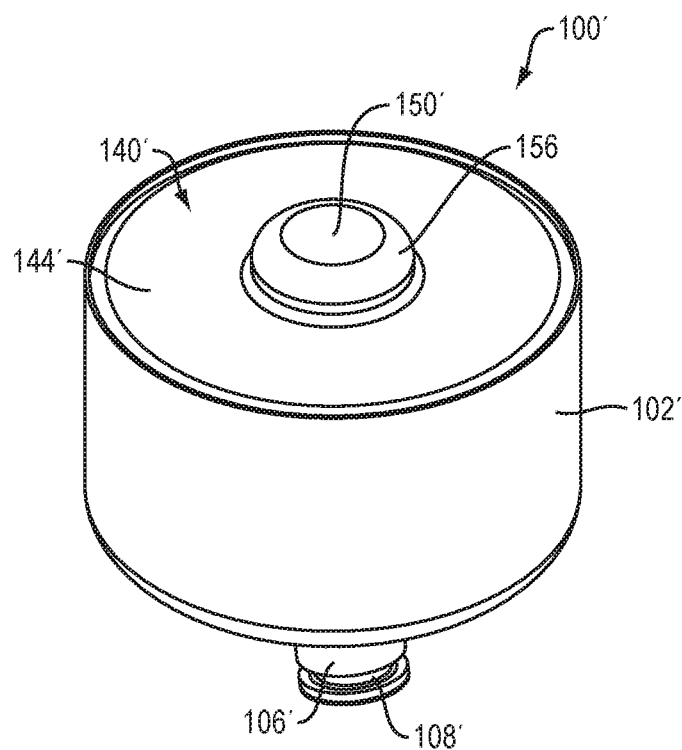
FIG. 42 is a bottom side perspective view of the filter capsule shown in FIG. 40.
Figure 43:
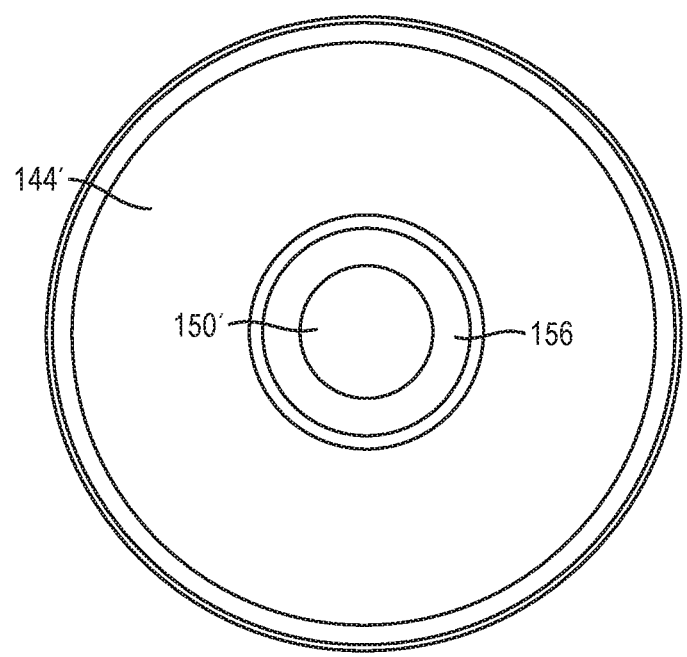
FIG. 43 is a bottom view of the filter capsule shown in FIG. 40.

Referring now to FIGS. 40, 42 and 43, a recessed outlet 140' is shown. Outlet 140' is structured with an annular recess wall 146' with an outlet end 154' formed at the top end of wall 146'. Wall 146' defines an outlet channel 150'. At least one or a plurality of fluid apertures or bores (not shown) may be formed in outlet end 154'. Alternatively, one or more fluid apertures may be formed in an outlet extension as disclosed in more detail below. Outlet wall 146' may have a slight taper from bottom to top with the top end being the smaller end of the taper. If present, this structural configuration facilitates insertion of the recessed wall into the filter cartridge subassembly 160 with cartridge inner wall 164' superposed about recess wall 146'.

An outlet flange 144' extends radially outwardly from a bottom end of wall 146'. Flange 144' functions as a bottom end cap for the enclosed filter cartridge subassembly 160 and as a bottom end cap for filter capsule 100' via registration against the bottom end of capsule body wall 102'. A cylindrical outlet extension 156 extends downwardly from flange 144' in coaxial alignment with recess wall 146'. An outer edge of the extension may be radiused so as not to present a sharply delineated annular edge. An end of outlet extension 156 may be formed with one or a plurality of fluid apertures to permit fluid egress from the filter capsule. It should be understood that outlet extension 156 may be left open to permit a single un-aerated stream a fluid to flow from the filter capsule. Alternatively, top recess wall end 154' and the bottom end of outlet extension 156 may both be formed with one or a plurality of fluid apertures.

Outlet extension 156 functions to further prevent contaminants from entering into the filter capsule by extending beyond the bottom surface of the recessed outlet. Extension 156 also may function as a drip edge to prevent fluids flowing out of the outlet to migrate along the contact surfaces of flange 144'. This construction reduces the potential spread of contaminants into the filter capsule from contact surfaces on the capsule outlet.

Similar to other embodiments disclosed herein, if optional fluid apertures are incorporated into the outlet construction, the apertures may be arranged and oriented in a variety of patterns to impart a particular fluid flow pattern. Illustratively, the apertures may be arranged in concentric circles, rows and columns, staggered rows, crossing rows, undulating rows, serpentine arrangements, etc. Aperture extensions may also be included for one or more of the apertures. The aperture orientations may be arranged to be uniformly diverging, uniformly converging, combinations of converging and diverging orientations as well as any variable pattern to impart specific flow patterns to fluids exiting the outlet.

Referring again to FIG. 40, to secure recess outlet 140' to filter cartridge subassembly 160, each cartridge wall bottom end may be formed with a tapered edge in similar fashion to the tapered edges of the top ends of the cartridge walls. More specifically, a bottom end 170 of inner cartridge wall 164 is formed with a taper for bonding to a top surface of flange 144'. A bottom end 168 of cartridge outer wall 162 is formed with a taper for bonding to a top surface of flange 144'. The walls are bonded to the recess outlet flange using any of the bonding methods disclosed herein including the illustrative method disclosed to bond cartridge cap 120' to the upper ends of the cartridge walls. Like cartridge top cap 120', flange 144' may be formed with channels to receive the bottom ends of the filter cartridge walls to create mechanically interlocked surfaces prior to bonding.

As shown in FIG. 40, cap extension 174 and outlet recess wall 146' extend into the cartridge core, but remain separated by a gap. The gap permits processed fluids to enter into the core and flow down into outlet channel 150' and out recessed outlet 140'. The length of the gap may be modified to meet flow requirements and specific needs, such as applications that involve a high rate of splash back into the filter capsule via the outlet. With situations like these, the gap may be reduced and the concave bottom 176 of cap extension 174 may be extended further into the cartridge core to better protect against contamination of the enclosed filter media.

Once flange 144' is secured to the filter cartridge walls, flange 144' functions to complete the enclosure of the filter media within the filter cartridge. It should be noted that the filter media is placed in assembled filter cartridge assembly 160 before recess outlet 140' is secured to the cartridge assembly. Alternatively, the assembly process may follow the sequential steps of securing recess outlet 140' to the bottom ends of the filter cartridge walls, placing the filter media between the walls and registered against flange 144', followed by securing cartridge cap 120' to the top ends of the cartridge walls.

With filter cartridge subassembly 160 secured to recessed outlet 140', the filter cartridge/recessed outlet assembly is inserted into capsule chamber 118' and secured therein by bonding flange 144' to the bottom end of filter capsule body 102'. Any of the bonding methods disclosed herein for bonding polymeric materials may be used to bond the outlet to the capsule body. With the fixed components of the filter capsule assembled, any accessory components, e.g., O-rings can be placed as required after the bonding processes are complete. It should be understood that the capsule construction process disclosed herein is for illustrative purposes only and that other assembly sequences and methods can be used and remain within the spirit and scope of this disclosure.

The combination of an inner surface of cartridge inner wall 164, a bottom surface of cartridge cap extension 174, outlet flange 144' and outlet wall 146' create a downstream chamber (downstream of the enclosed filter media) isolated from an upstream chamber defined by capsule inner wall surface 103', a bottom surface of top end 104', an upstream surface of the enclosed filter media and the portions of outlet flange 144' radially outside cartridge inner wall 164. Fluid communication between the upstream chamber and the downstream chamber occurs through the enclosed filter media and cartridge inner wall slots 135'. Positive fluid pressure originating at the capsule inlet creates a pressure gradient that urges incoming fluid (via inlet 106') to enter the upstream chamber, flow through slots 135' in cartridge outer wall 162, into the enclosed filter membrane and/or filter media, into the downstream chamber via slots 135' in cartridge inner wall 164, and out recess outlet 140'.

Since filter capsule 100' is constructed with the same offset inlet shown and disclosed for filter capsule 100, the functional impact of the offset inlet as illustratively shown in FIG. 34, applies equally to filter capsule 100'. Filter capsule 100' will project a fluid flow path offset from the axis of the inlet connection point. This permits the user to orient the flow path to fall on a specific surface within a container, e.g., a sink or shower shall, that will minimize splash and the potential spread of contaminants. For example, the stream can be directed away from the sink drain where contaminants are likely to reside and be subject to dispersal from the direct impact of a forceful stream of fluid. This is accomplished by rotating capsule 100' about the inlet connection that rotates the inlet within the fluid source connector.

The possible fluid flow strike points describe a circular pattern, the diameter of which can be increased, or decreased by increasing or decreasing, respectively, the angular offset of the inlet axis relative to the capsule longitudinal axis. Illustratively, if the offset is 15° as shown, the potential flow pattern will describe a circular flow pattern that can be altered from a maximum diameter via the application of a threshold fluid pressure, or a reduced diameter pattern, if the pressure is reduced enough to permit gravity to alter the flow pattern toward the inlet axis. If the offset is increased, e.g., 30°, the maximum diameter of the flow pattern will be greater than the maximum diameter of the 15° offset capsule at the same fluid pressure. In sum, the offset angle and/or the fluid pressure can be altered to alter the potential flow pattern and fluid strike points available with rotation of the capsule about the inlet connection.

The filter media broadly disclosed herein may be constructed from fibrous material, including, but not limited to, microfibers and nanofibers of polyethylene, polypropylene, nylon, polyester, carbon, polypropylene sulfide (PPS), Polytetrafluoro-ethylene (Teflon® PTFE), cellulose including cellulose/diatomaceous earth or silica blends, cellulose/carbon particles or fibers, cellulose/ion exchange resins, as are available from general media suppliers from Gusmer Enterprises, Inc. and Purolator Liquid Process; others include technical paper filtration media from Lydall, Inc. and Ahlstrom Corporation. Still further filter materials may include cellulose derivatives such as cellulose acetate, cotton, polyamides, polyesters, fiberglass, fluoropolymers such as perfluoroalkoxy (PFA) and its derivatives, MFA (copolymer of tetrafluoroethylene and perfluoromethyl vinyl ether and sold under the name Hyflon), fluorinated ethylene propylene polymer (FEP) and the like, as well as combinations of any of the disclosed filter media materials.

For filters formed as discs, each filter disc may comprise one layer or multiple layers each layer having the same or different micron retention sizes. Filter pore sizes may range from about 0.01 microns to about 50 microns and up. The discs may be constructed from a number of manufacturing processes including, but not limited to, wet-laid processes (similar to papermaking), wet casting, melt-cast, or dry processes such as air-laid, melt-blown, spun-bond, etc. as is well known in the art. It should be understood that toroidal and pleated filter configurations may also be used with, or without, cartridges.

The materials used to construct the filter capsule components including the outlet inserts may be the same for all these components. The components may be injection molded with any thermal plastic materials, including, but not limited to, Polypropylene (PP), Polyethylene (PE), nylon, Polysulfone, Perfluoroalkoxy (PFA) polymer resin, Polycarbonate (PC), PS, Polyethersulfone (PES), Ethylene-clorotrifluoroethylene copolymer (ECTFE) and mixtures thereof. The outlet inserts may also be formed from metallic materials such as stainless steel. It should be understood other materials and manufacturing methods well known in the art may be used to construct these components.

While the present disclosure has been described in connection with several embodiments thereof, it will be apparent to those skilled in the art that many changes and modifications may be made without departing from the true spirit and scope of the present disclosure. Accordingly, it is intended by the appended claims to cover all such changes and modifications as come within the true spirit and scope of the disclosure.

What I claim as new and desire to secure by United States Letters Patent is:

1. A filter capsule comprising:
   an integral filter capsule body and filter capsule top having a capsule body wall with a bottom edge and a capsule top end, wherein the integral filter capsule body and filter capsule top end has a longitudinal axis and partially defines a filter capsule chamber;
   an inlet port extending upwardly from, and formed integral with, the integral filter capsule body and filter capsule top and having a fixed axis angularly offset from the longitudinal axis of the integral filter capsule body and filter capsule top;
   a filter cartridge secured in the filter capsule chamber comprising an outer filter cartridge wall having a top edge and a bottom edge, an inner filter cartridge wall having a top edge and a bottom edge and spaced radially inwardly from the outer cartridge wall, and a filter cartridge top secured to the top edges of the filter cartridge outer and inner walls, wherein the filter cartridge walls are substantially concentrically arranged, wherein the inner filter cartridge wall defines a filter cartridge core, and wherein the filter cartridge top is formed with a cylindrical filter cartridge extension that extends downwardly into the filter cartridge core, wherein a bottom end of the filter cartridge extension is formed with a concave surface facing toward a bottom end of the filter capsule;
   filter media secured in the filter cartridge; and,
   a combination filter capsule body bottom end cap and filter cartridge bottom end cap secured to the capsule body wall bottom edge and secured to the bottom edges of the filter cartridge outer and inner walls, wherein the combination filter capsule body bottom end cap and filter cartridge bottom end cap forms an outlet.

2. The filter capsule of claim 1 wherein the recessed outlet further comprises a second cylindrical extension extending downwardly from the flange surface.

3. The filter capsule of claim 2 wherein the second cylindrical extension is formed with a plurality of apertures at a distal end to permit fluid egress from the filter capsule.

4. The filter capsule of claim 2 wherein the outlet extension is formed with a plurality of apertures at an end distal from the flanged surface.

5. The filter capsule of claim 1 wherein in the inlet port further comprises at least one annular O-ring channel formed in a port outer wall, the filter capsule further comprising an O-ring secured in the at least one O-ring channel.

6. The filter capsule of claim 1 wherein the filter media is selected from the group consisting of toroidal-shaped, disc-shaped and loose filter media, filter membranes and combinations thereof.

7. The filter capsule of claim 1 wherein the inlet port axis is angularly offset from the integral filter capsule body and filter capsule top longitudinal axis from about 1° to about 50°.

8. The filter capsule of claim 1, wherein the cross-sectional diameter of the filter cartridge and filter cartridge cap is less than the cross-sectional diameter of the capsule chamber, wherein an annular gap is defined between an inner surface of the capsule body wall and an outer surface of the filter cartridge, wherein the annular gap is in fluid communication with the inlet port and the filter media.

9. The filter capsule of claim 8, wherein an upper gap in the capsule chamber is defined between a top surface of the filter cartridge cap and a bottom surface of the integral filter capsule body and filter capsule top end, wherein the upper gap is in fluid communication with the inlet port and the annular gap.

10. The filter capsule of claim 9, wherein the filter cartridge walls are formed with a plurality of gaps or passages, wherein the gaps in the outer filter cartridge wall permit fluid communication between the annular gap and the filter media, and wherein the gaps in the inner filter cartridge wall permit fluid communication between the filter media and the filter cartridge core.

11. The filter capsule of claim 1 wherein the outlet is a recessed outlet having a flange surface secured to a bottom end of the integral filter capsule body and filter capsule top and a cylindrical outlet extension extending upwardly from the flanged surface partially into the filter cartridge core and spaced from the concave surface of the filter cartridge extension.

* * * * *